United States Patent
Biskeborn

(10) Patent No.: US 10,699,741 B1
(45) Date of Patent: Jun. 30, 2020

(54) MULTI-CHANNEL MAGNETIC RECORDING HEAD HAVING COMPLIANTLY ENCAPSULATED TRANSDUCERS

(71) Applicant: International Business Machines Corporation, Armonk, NY (US)

(72) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/242,927

(22) Filed: Jan. 8, 2019

(51) Int. Cl.
*G11B 5/29* (2006.01)
*G11B 15/18* (2006.01)
*G11B 5/187* (2006.01)
*G11B 5/105* (2006.01)

(52) U.S. Cl.
CPC .......... *G11B 15/1841* (2013.01); *G11B 5/105* (2013.01); *G11B 5/187* (2013.01); *G11B 5/29* (2013.01)

(58) Field of Classification Search
CPC ................................. G11B 5/105; G11B 5/29
USPC ......................................................... 360/121
See application file for complete search history.

(56) References Cited

U.S. PATENT DOCUMENTS

| | | | | |
|---|---|---|---|---|
| 4,345,367 A | * | 8/1982 | Chase | G11B 5/29 29/603.12 |
| 5,055,957 A | * | 10/1991 | Daughenbaugh | C03C 3/072 360/121 |
| 6,252,741 B1 | | 6/2001 | Ahn | |
| 6,584,660 B1 | * | 7/2003 | Shimogawa | B41J 2/14233 219/121.69 |
| 6,631,547 B2 | | 10/2003 | Yoshida et al. | |
| 7,450,341 B2 | * | 11/2008 | Dugas | G11B 5/3103 360/121 |
| 7,567,409 B2 | | 7/2009 | Lee et al. | |
| 7,751,154 B2 | | 7/2010 | Wu | |
| 8,654,473 B2 | | 2/2014 | Fasen | |
| 8,730,615 B1 | * | 5/2014 | Poorman | G11B 5/00826 360/121 |
| 2001/0034185 A1 | | 10/2001 | Katoh et al. | |
| 2002/0171974 A1 | * | 11/2002 | Dugas | G11B 5/127 360/121 |
| 2004/0223261 A1 | * | 11/2004 | Deshpande | G11B 5/105 360/234.7 |

(Continued)

FOREIGN PATENT DOCUMENTS

WO 9724711 A1 7/1997

OTHER PUBLICATIONS

Biskeborn et al., "Tape Head Technology," Information Storage Industry Consortium, International Magnetic Tape Storage Roadmap, May 2012, pp. 107-128.

*Primary Examiner* — Jefferson A Evans
(74) *Attorney, Agent, or Firm* — Zilka-Kotab, P.C.

(57) ABSTRACT

An apparatus, according to one embodiment, includes: a magnetic tape head module having: a substrate and an encapsulation layer which includes a compliant, deformable material. The magnetic tape head module also includes a closure, and a plurality of transducers positioned in an array along a longitudinal length of the magnetic tape head module. The array of transducers is sandwiched between at least a portion of the encapsulation layer and the substrate. Moreover, a portion of the encapsulation layer extends toward the substrate directly between adjacent transducers in the array.

20 Claims, 22 Drawing Sheets

(56) References Cited

U.S. PATENT DOCUMENTS

| | | | |
|---|---|---|---|
| 2005/0122620 A1* | 6/2005 | Suda | G11B 5/00817 360/121 |
| 2005/0254170 A1* | 11/2005 | Dugas | G11B 5/3103 360/119.11 |
| 2006/0012922 A1* | 1/2006 | Shoji | B82Y 10/00 360/316 |

* cited by examiner

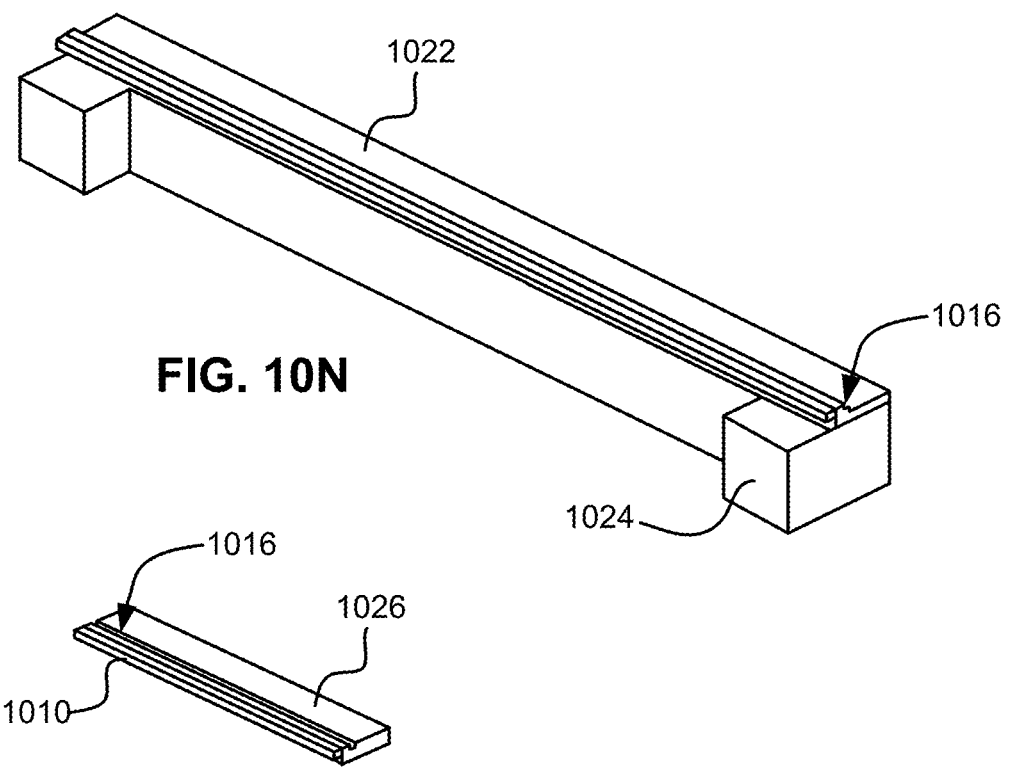
FIG. 10N
FIG. 10O
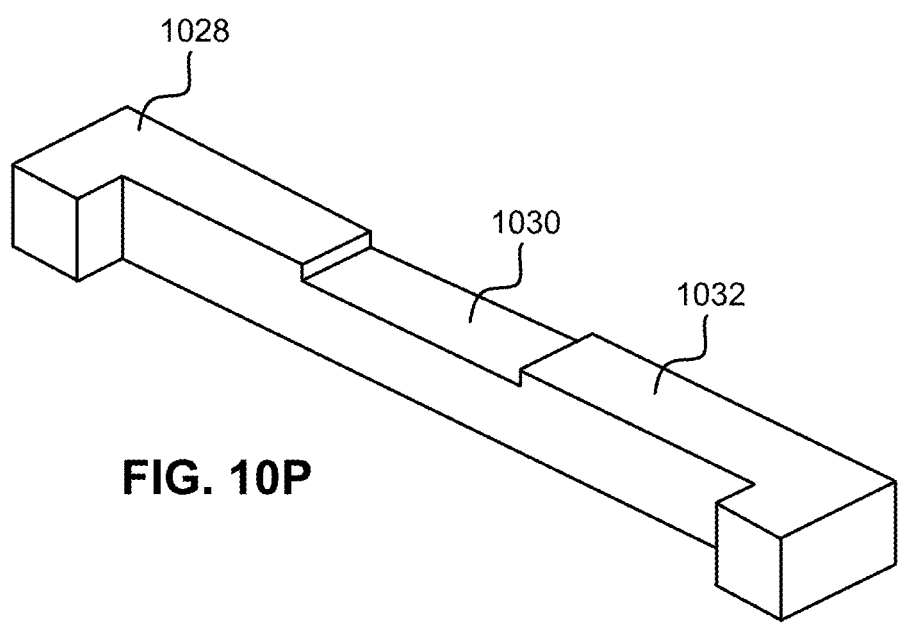
FIG. 10P

MULTI-CHANNEL MAGNETIC RECORDING HEAD HAVING COMPLIANTLY ENCAPSULATED TRANSDUCERS

BACKGROUND

The present invention relates to data storage systems, and more particularly, this invention relates to the pitch between transducers of magnetic tape head modules.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux, in near contact with the tape to effect writing sharp transitions, and to have the read elements in near contact with the tape to provide effective coupling of the magnetic field from the tape to the read elements.

SUMMARY

An apparatus, according to one embodiment, includes: a magnetic tape head module having: a substrate, an encapsulation layer which includes a compliant, deformable material. The magnetic tape head module also includes a closure, and a plurality of transducers positioned in an array along a longitudinal length of the magnetic tape head module. The array of transducers is sandwiched between at least a portion of the encapsulation layer and the substrate. Moreover, a portion of the encapsulation layer extends toward the substrate directly between adjacent transducers in the array.

A tape drive, according to another embodiment, includes: a magnetic tape head, a drive mechanism for passing a magnetic medium over the magnetic tape head, and a controller electrically coupled to the magnetic tape head. Furthermore, the magnetic tape head includes: a module having: a substrate, and a first encapsulation layer which includes a compliant, deformable material. The module further includes a closure, and a plurality of transducers positioned in an array along a longitudinal length of the magnetic tape head module. The array of transducers is sandwiched between at least a portion of the first encapsulation layer and the closure.

An apparatus, according to yet another embodiment, includes: a magnetic tape head module having: a substrate, and a first encapsulation layer which includes a compliant, deformable material. The magnetic tape head module also includes a closure, and a plurality of transducers positioned in an array along a longitudinal length of the magnetic tape head module. At least some of the plurality of transducers are sandwiched between at least a portion of the first encapsulation layer and the substrate. Moreover, a portion of the first encapsulation layer extends toward the substrate directly between adjacent transducers in the array.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 10N is a perspective view of a module upon forming of a skiving edge thereon according to one embodiment.

FIG. 10O is a perspective view of a chip cut from a row according to one embodiment.

FIG. 10P is a perspective view of a U-beam according to one embodiment.

DETAILED DESCRIPTION

Figure 1A:
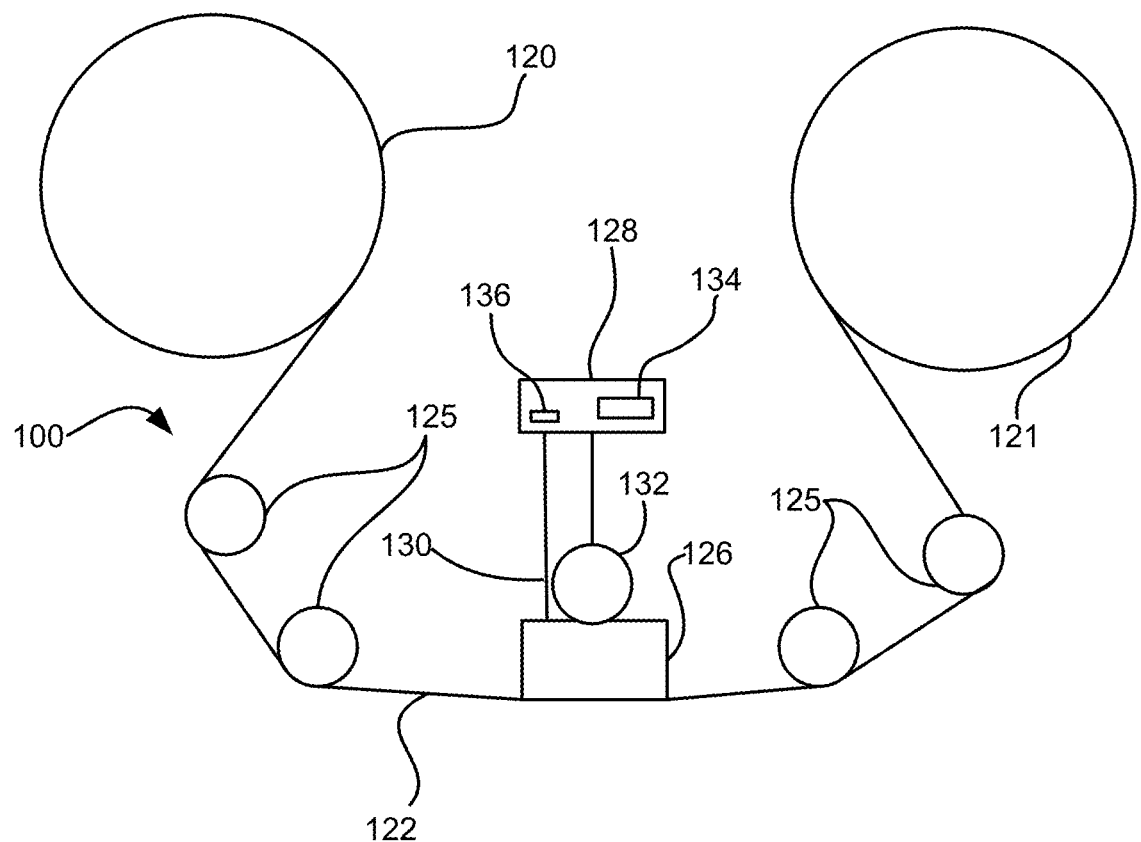
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof, some of which are able to insulate the transducers from forces caused by dimensional instabilities of the various layers in a magnetic tape head module. Specifically, by implementing an elastic encapsulation layer which includes one or more materials which are able to dampen the effect that these forces have on the position and/or orientation of each of the transducers with respect to each other, the elastic encapsulation layer is able to achieve a uniform (e.g., stable) pitch between adjacent ones of the transducers, e.g., as will be described in further detail below.

In one general embodiment, an apparatus includes: a magnetic tape head module having: a substrate, an encapsulation layer which includes a compliant, deformable material. The magnetic tape head module also includes a closure, and a plurality of transducers positioned in an array along a longitudinal length of the magnetic tape head module. The array of transducers is sandwiched between at least a portion of the encapsulation layer and the substrate. Moreover, a portion of the encapsulation layer extends toward the substrate directly between adjacent transducers in the array.

In another general embodiment, a tape drive includes: a magnetic tape head, a drive mechanism for passing a magnetic medium over the magnetic tape head, and a controller electrically coupled to the magnetic tape head. Furthermore, the magnetic tape head includes: a module having: a substrate, and a first encapsulation layer which includes a compliant, deformable material. The module further includes a closure, and a plurality of transducers positioned in an array along a longitudinal length of the magnetic tape head module. The array of transducers is sandwiched between at least a portion of the first encapsulation layer and the closure.

In yet another general embodiment, an apparatus includes: a magnetic tape head module having: a substrate, and a first encapsulation layer which includes a compliant, deformable material. The magnetic tape head module also includes a closure, and a plurality of transducers positioned in an array along a longitudinal length of the magnetic tape head module. At least some of the plurality of transducers are sandwiched between at least a portion of the first encapsulation layer and the substrate. Moreover, a portion of the first encapsulation layer extends toward the substrate directly between adjacent transducers in the array.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
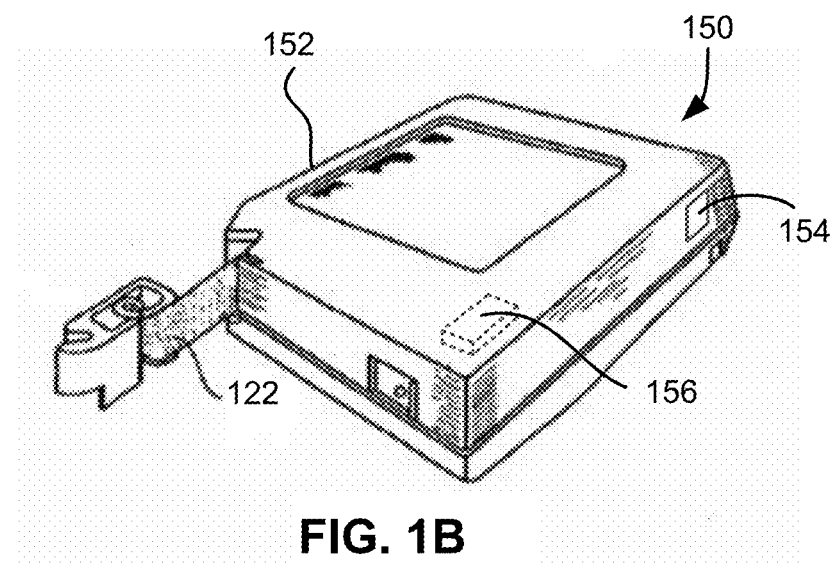
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
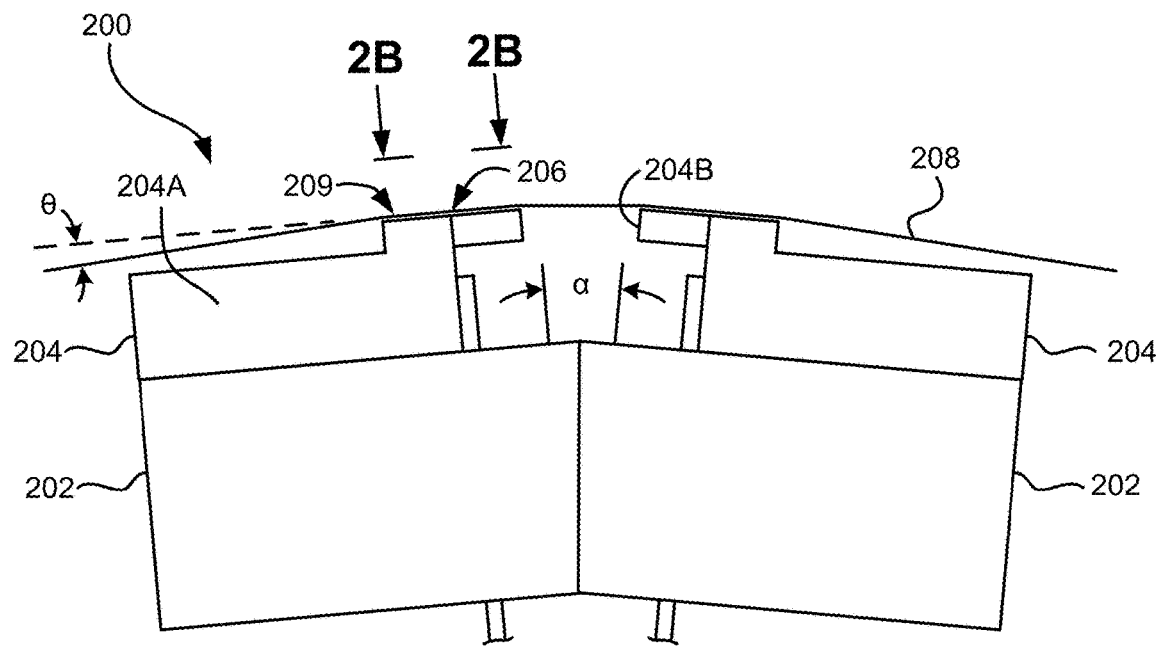
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
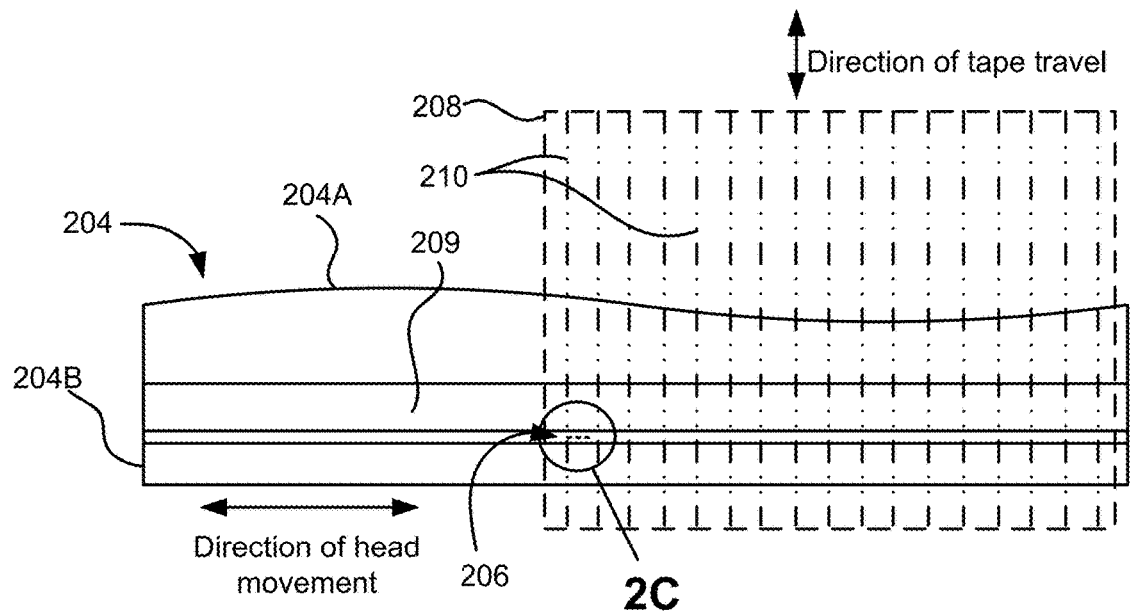
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
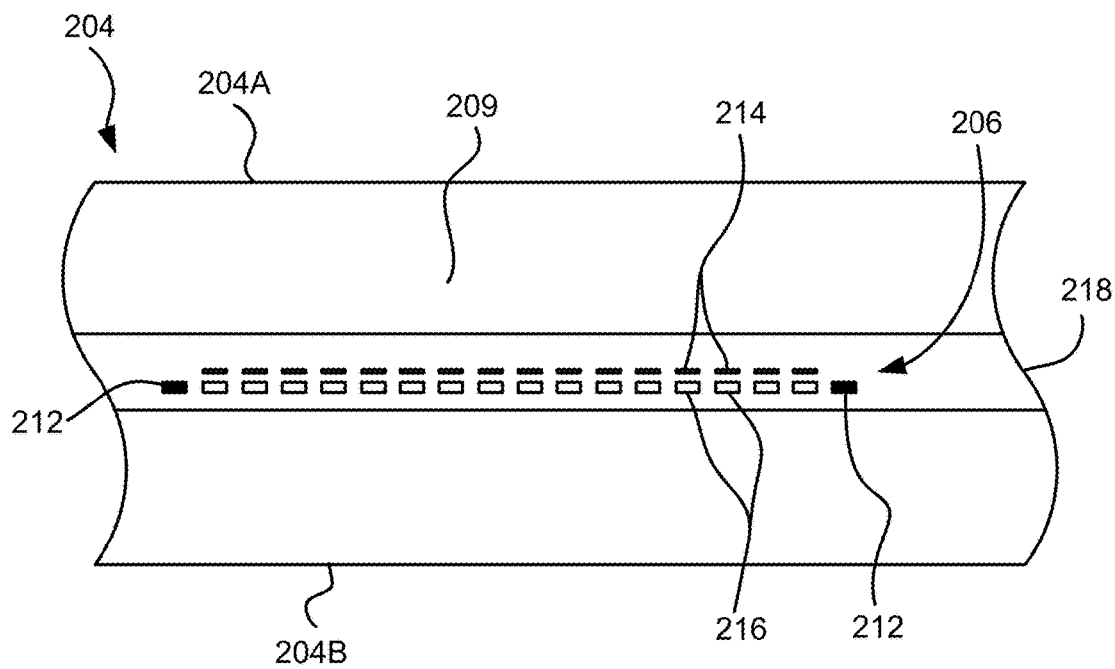
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
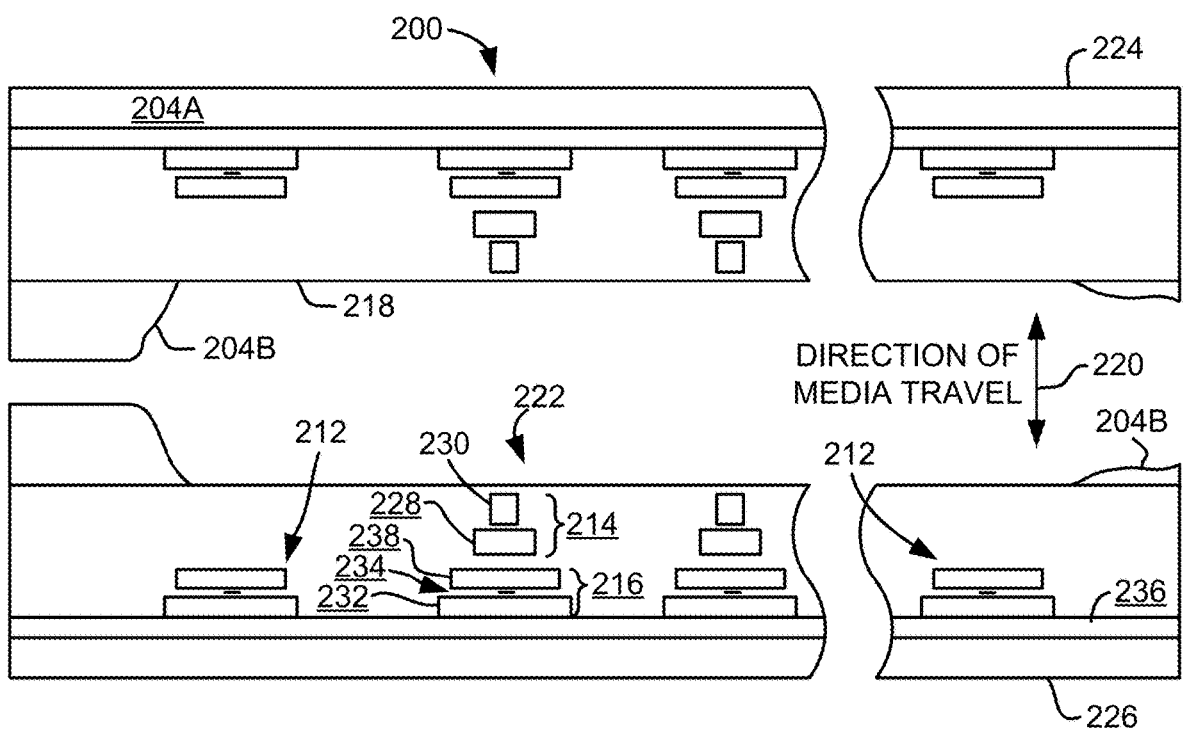
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
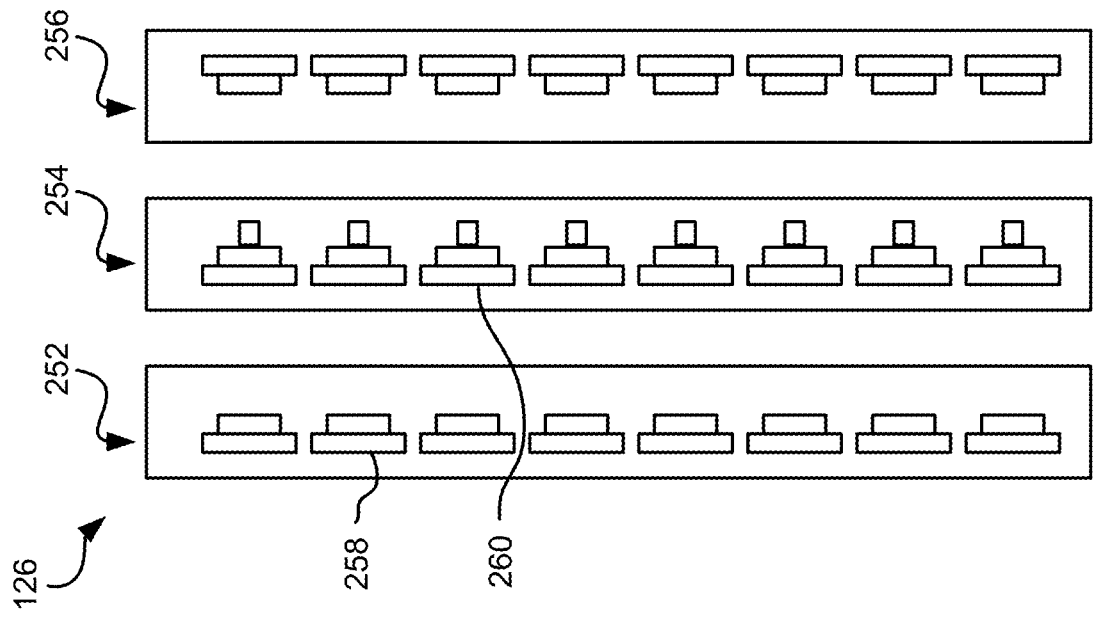
FIG. 4 is a partial tape bearing surface view of a magnetic head having a read-write-read configuration.
Figure 3:
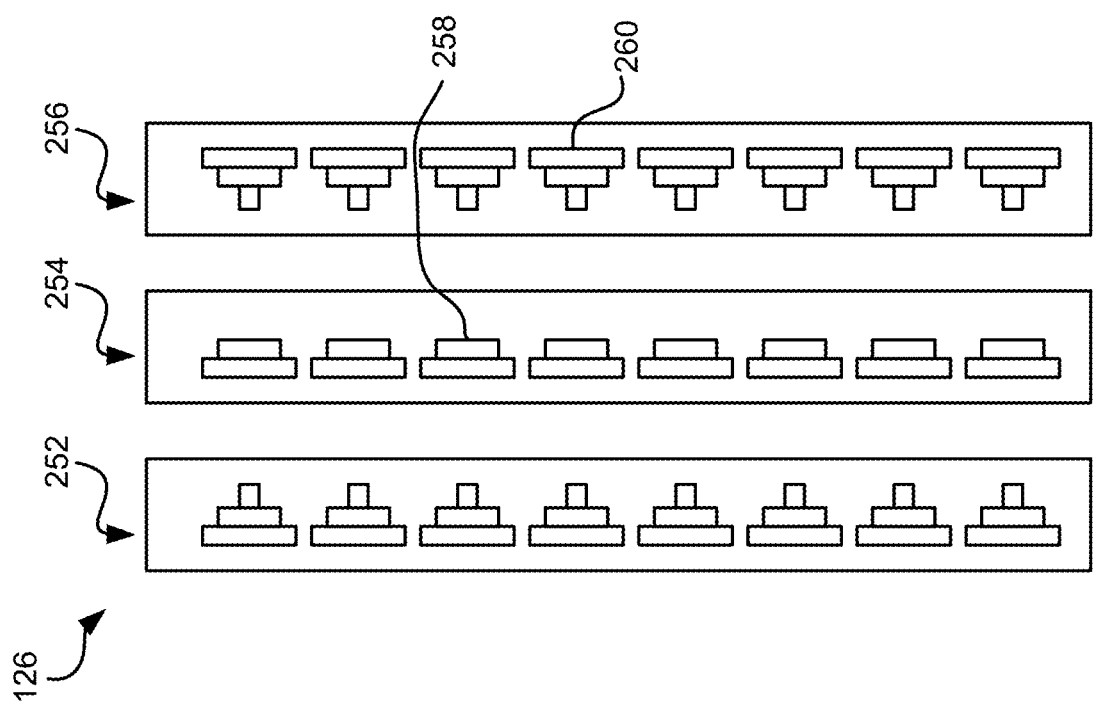
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
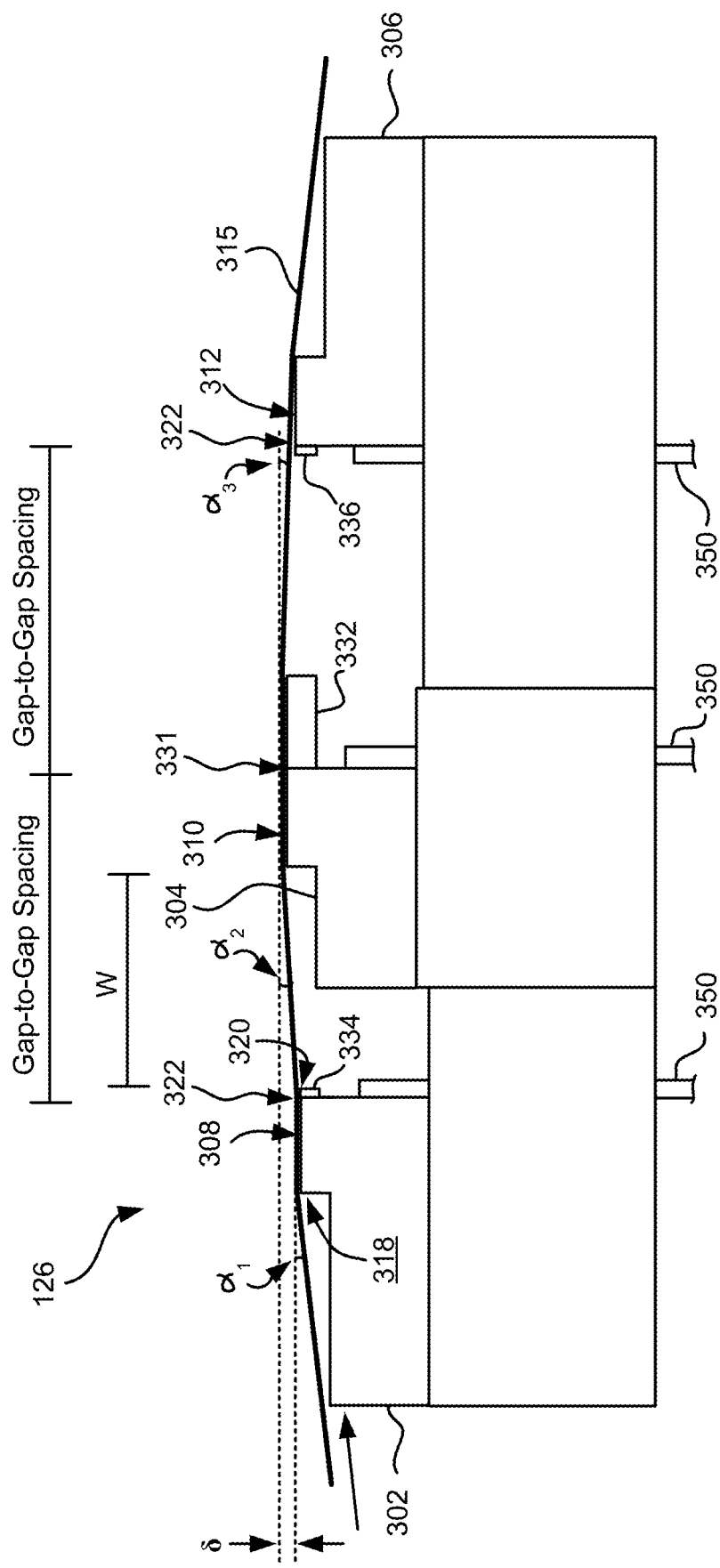
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
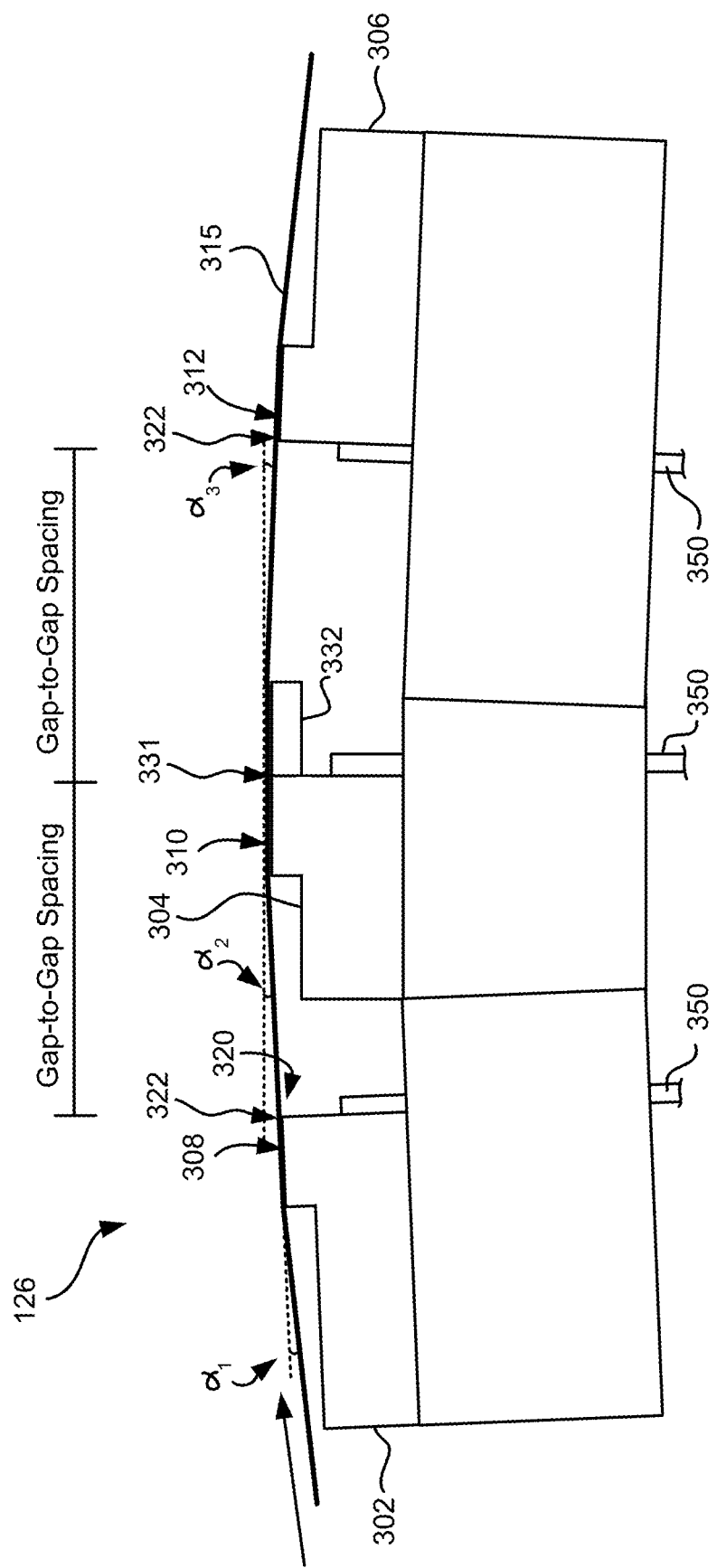
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
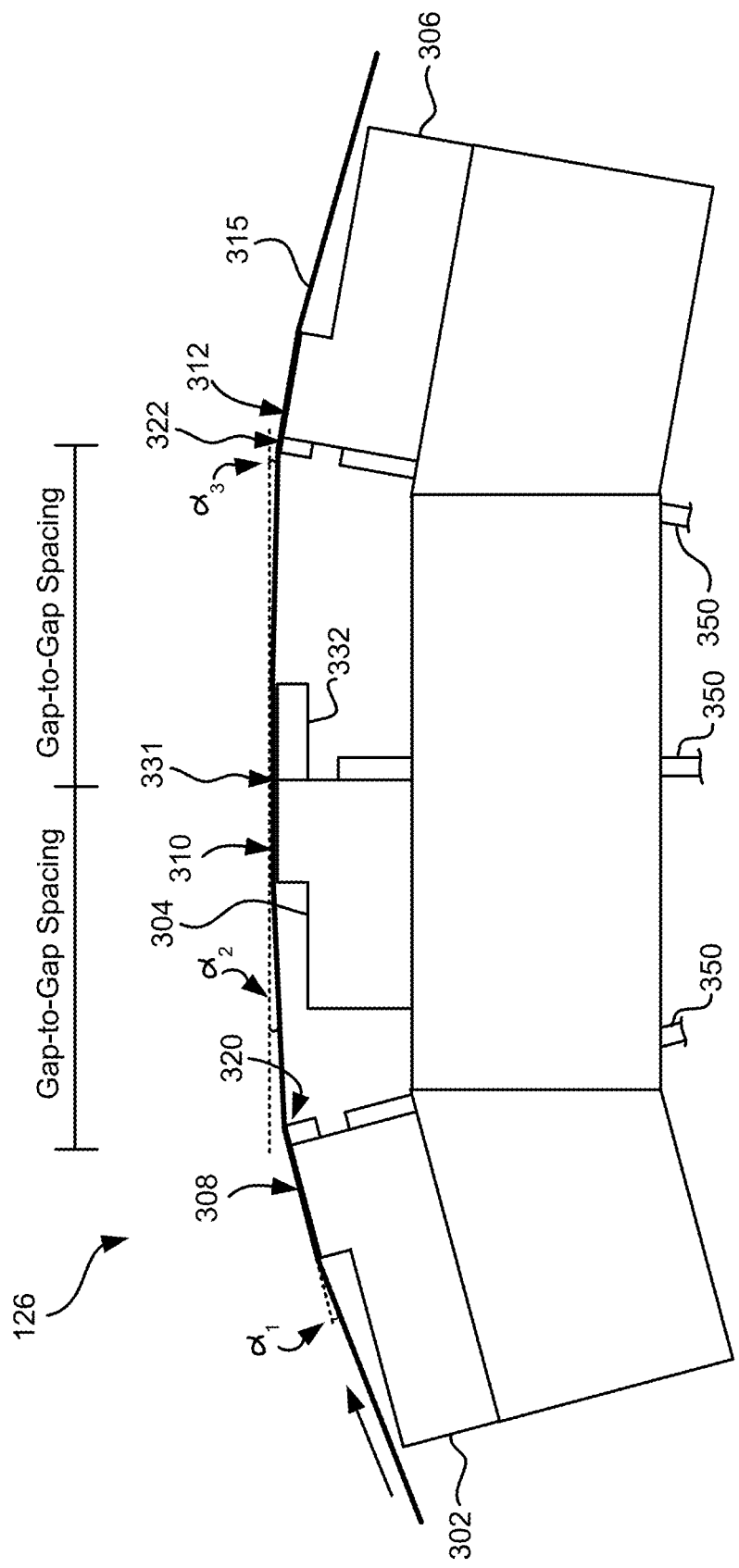
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
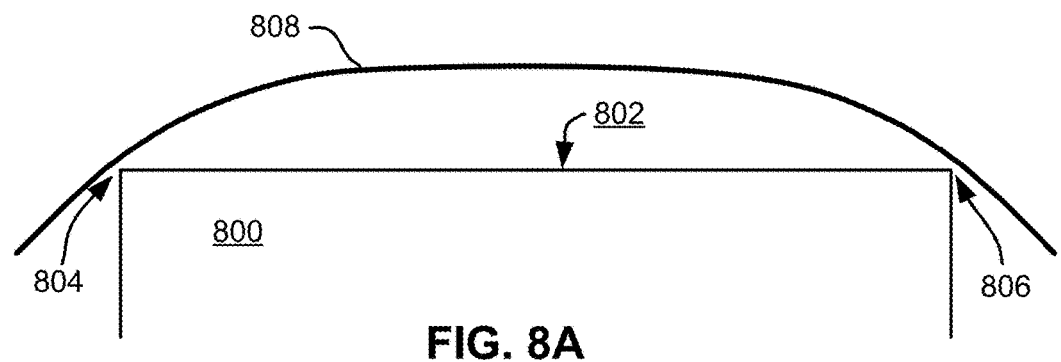
FIGS. 8A-8C are schematics depicting the principles of tape tenting.
Figure 8B:
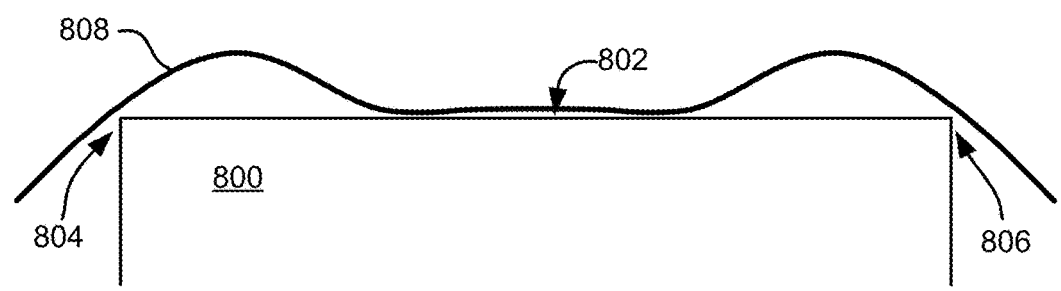
Figure 8C:
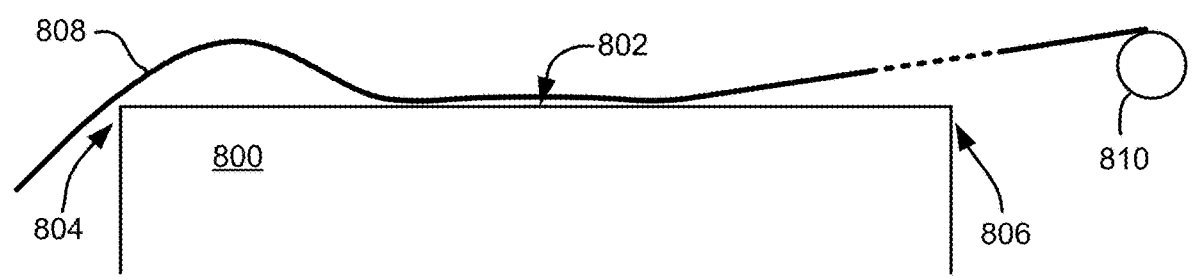

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
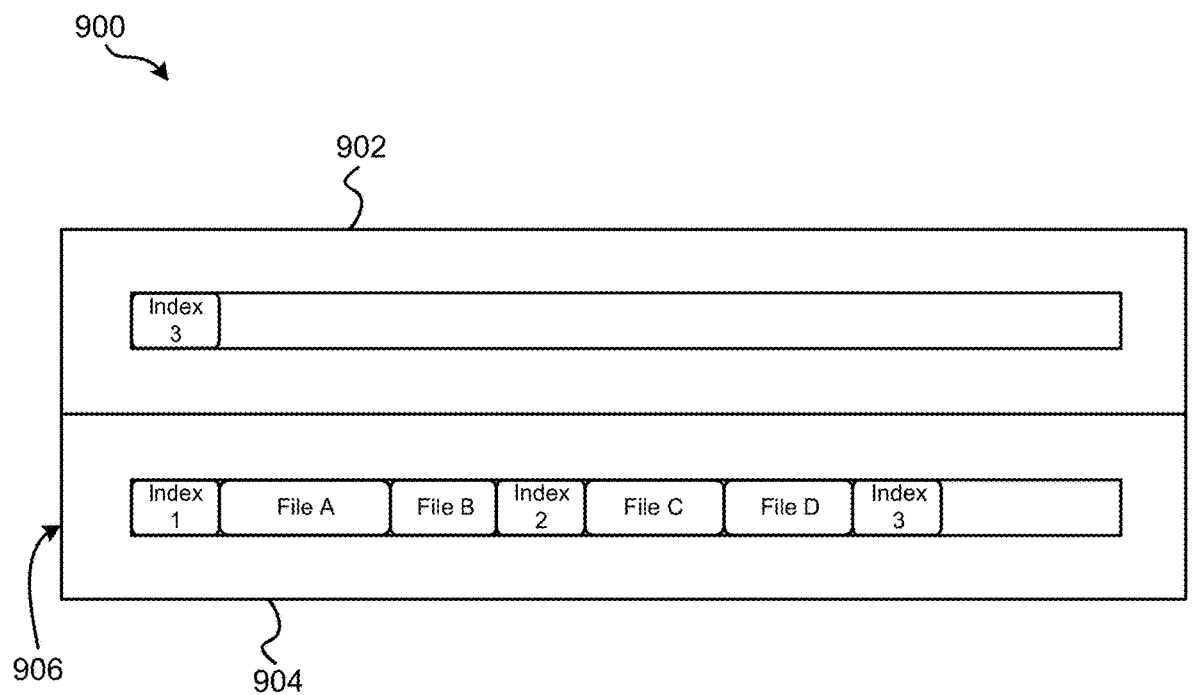
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Figure 10A:
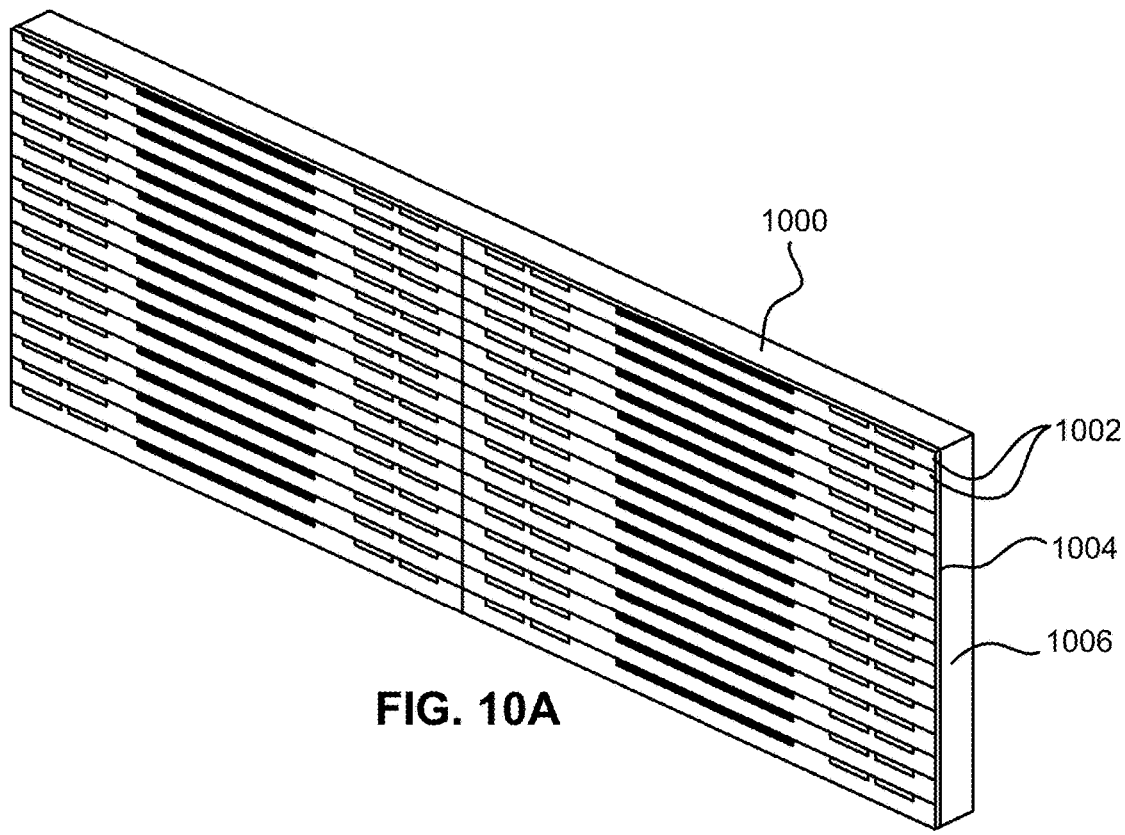
FIG. 10A is a perspective view of a section of a thin film wafer according to one embodiment.

According to the preferred method for forming the head, a wafer containing multiple "chips" each having read and/or write circuitry is formed by traditional thin film processing. The thin film wafer is cut into rectangular sections. FIG. 10A illustrates a section 1000 of a thin film wafer according to one embodiment. As shown, the section 1000 includes a plurality of rows 1002 of circuitry formed in a layer 1004 of thin films formed on a substrate 1006. The section 1000 will eventually be sliced and cut to form a head or chips. The circuitry may include, for example, read transducers, write transducers, servo transducers, electronic lapping guides, etc. Each row 1002 can contain multiple head images. Thus, while each row contains two head images in this figure, rows built according to various embodiments may have more or less than two head images.

Figure 10B:
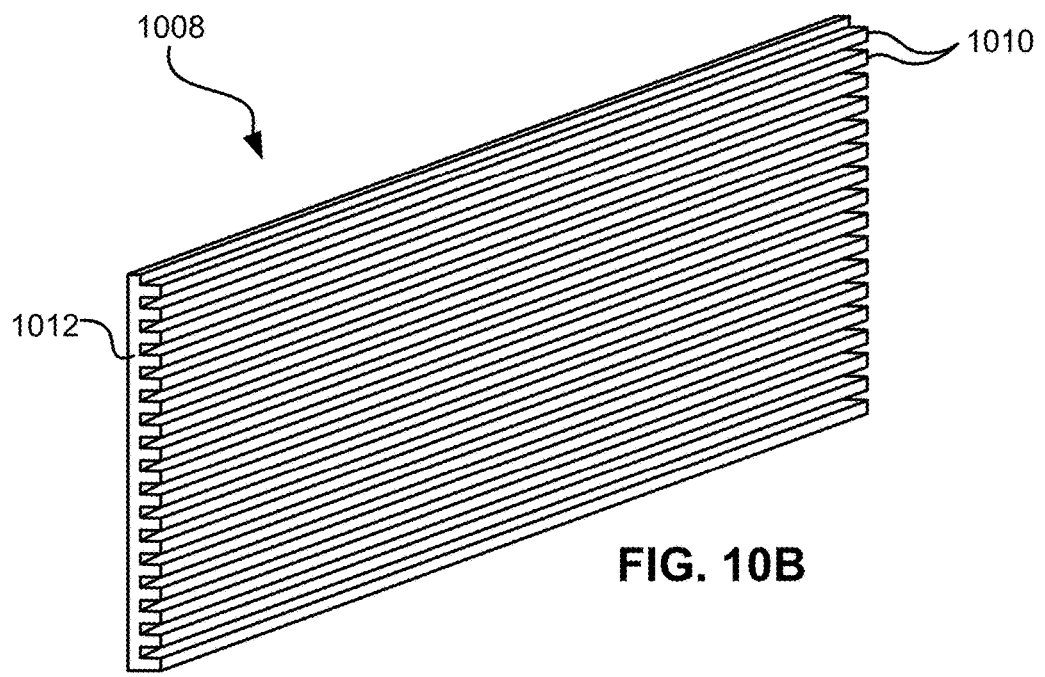
FIG. 10B is a perspective view of an array of closures according to one embodiment.

FIG. 10B shows an array 1008 of closures 1010 that will be bonded to a section 1000 of the wafer. The closures 1010 may be of conventional construction. As shown, the closures 1010 in this example extend from a top portion 1012.

Figure 10C:
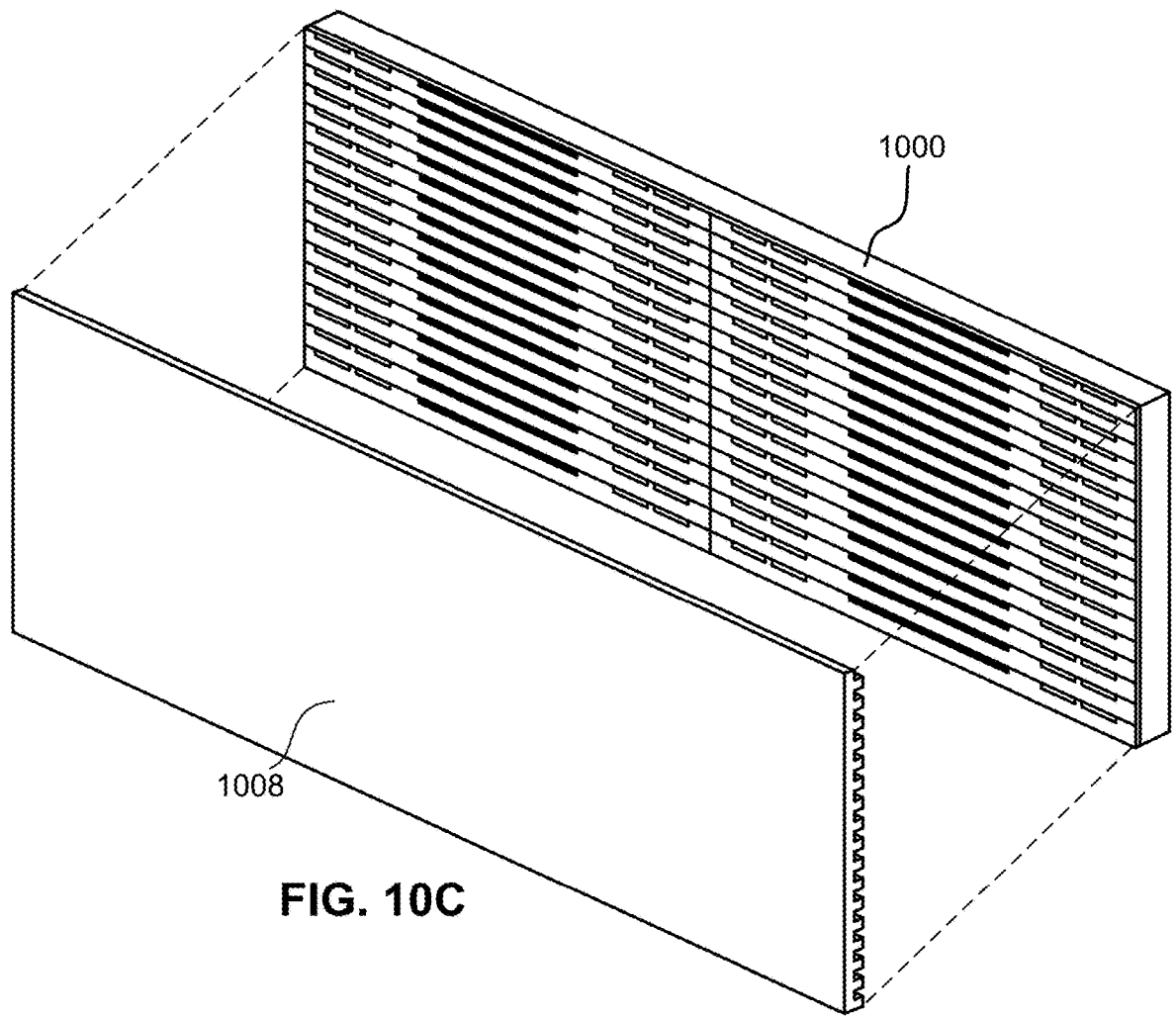
FIG. 10C is a perspective view depicting coupling of the array of closures to the section of wafer according to one embodiment.

FIG. 10C illustrates how the array 1008 is bonded to a section 1000. A conventional adhesive may be used to bond the array 1008 to the section 1000.

Figure 10D:
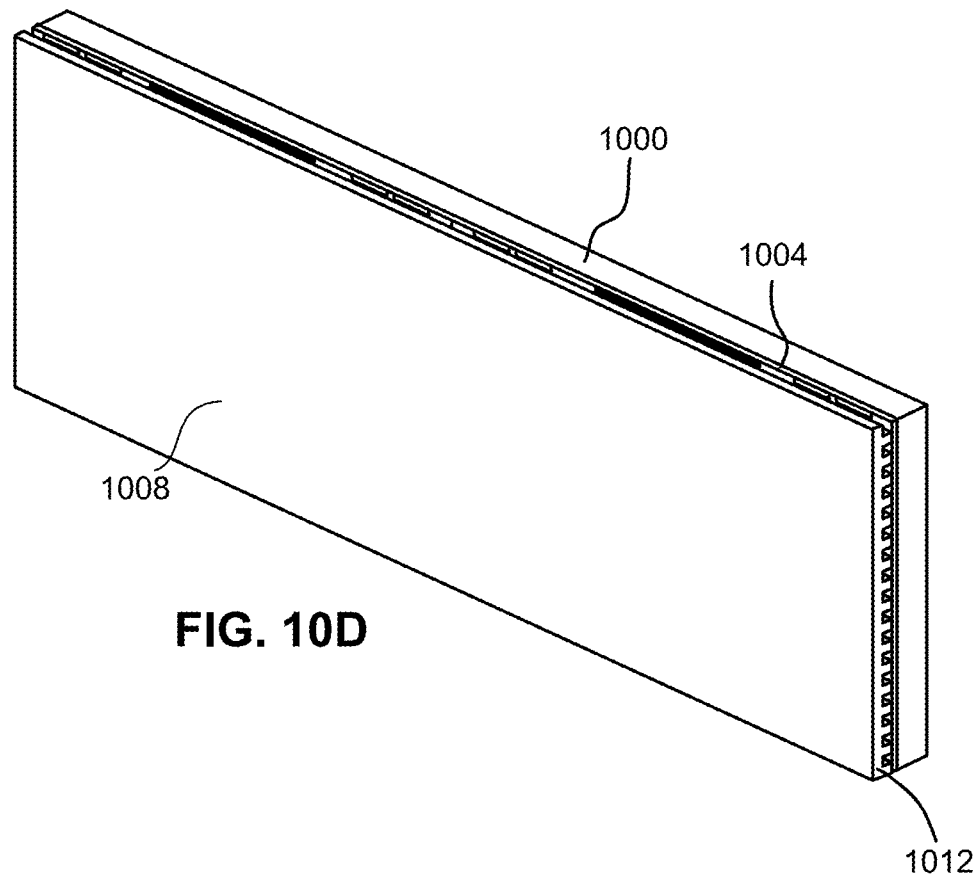
FIG. 10D is a perspective view of the array of closures coupled to the section of wafer according to one embodiment.

FIG. 10D depicts the array 1008 of closures 1010 bonded to the section 1000 of wafer. The top portion 1012 of the array 1008 of closures 1010 may be removed prior to slicing the section 1000 into rows 1002. Portions of the closures 1010 themselves may be removed as well to define the length of the tape bearing surface of each closure 1010. Grinding, lapping, and/or other subtractive process may be used.

Figure 10E:
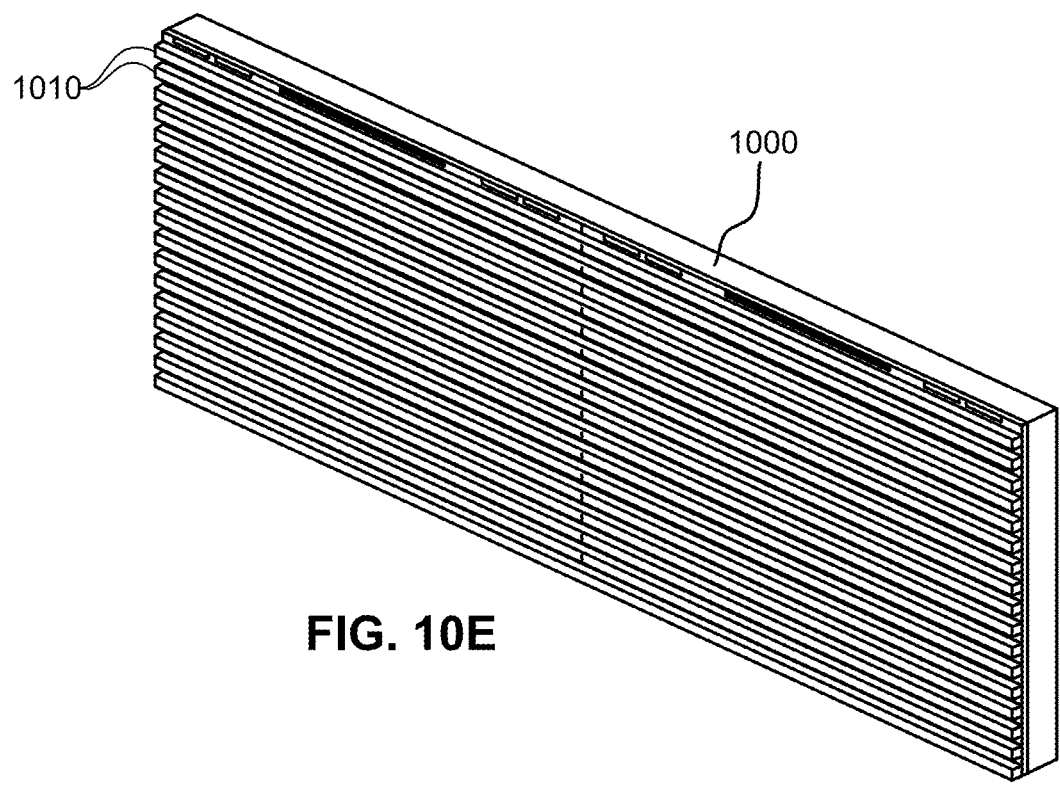
FIG. 10E is a perspective view of the closures coupled to the section of wafer upon removing a top portion of the array of closures according to one embodiment.

FIG. 10E shows the closures 1010 and section 1000 with the top portion 1012 of the array of closures 1010 removed. The portions of the closure 1010 remaining after processing support the tape as the tape passes over the head to protect the delicate electronics in the head from wear.

Figure 10F:
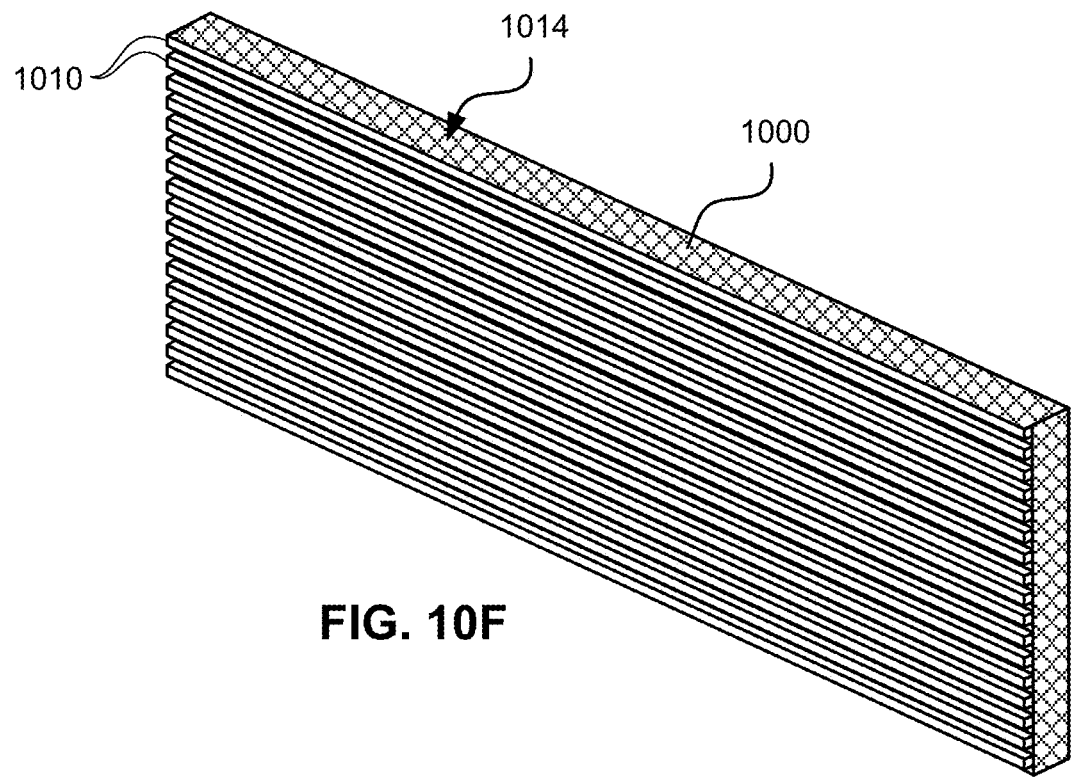
FIG. 10F is a perspective view of the section of wafer of FIG. 10E in an inverted position according to one embodiment.

FIG. 10F shows the section 1000 of FIG. 10E inverted from the orientation shown in FIG. 10E. The surface of the end 1014 is rough from the processing step in which the section is cut from the wafer, e.g., where a cutting blade is used to cut the section 1000 from the wafer. All surfaces of peripheral ends of the section 1000 and closures 1010 typically have a similar roughness from the cutting step. In FIG. 10F, a texture has been added to the drawing to exemplify the roughness of the surfaces of the section 1000. This roughness upsets optical recognition of features on the end 1014, such as the location of the circuitry in the gap between the substrate upon which the circuitry is formed and the closure 1010 and so reduces the precision. Therefore, optical positioning techniques are not available for locating positions to make cuts. This limited ability to precisely locate features on the end 1014 was not an issue for conventional head processing techniques, because a long tape bearing surface was desired. However, where a shorter tape bearing surface is desired and/or a skiving edge is to have a very specific placement relative to the thin film layer, more precision is needed.

Accordingly, the end 1014 of the section 1000 is partially lapped for polishing the end 1014 and the closure 1010. Preferably, the lapping is performed at least until optical detection of features on the end 1014 of the section 1000 is possible, but not down to the desired tape bearing surface. Conventional lapping techniques may be used.

Figure 10G:
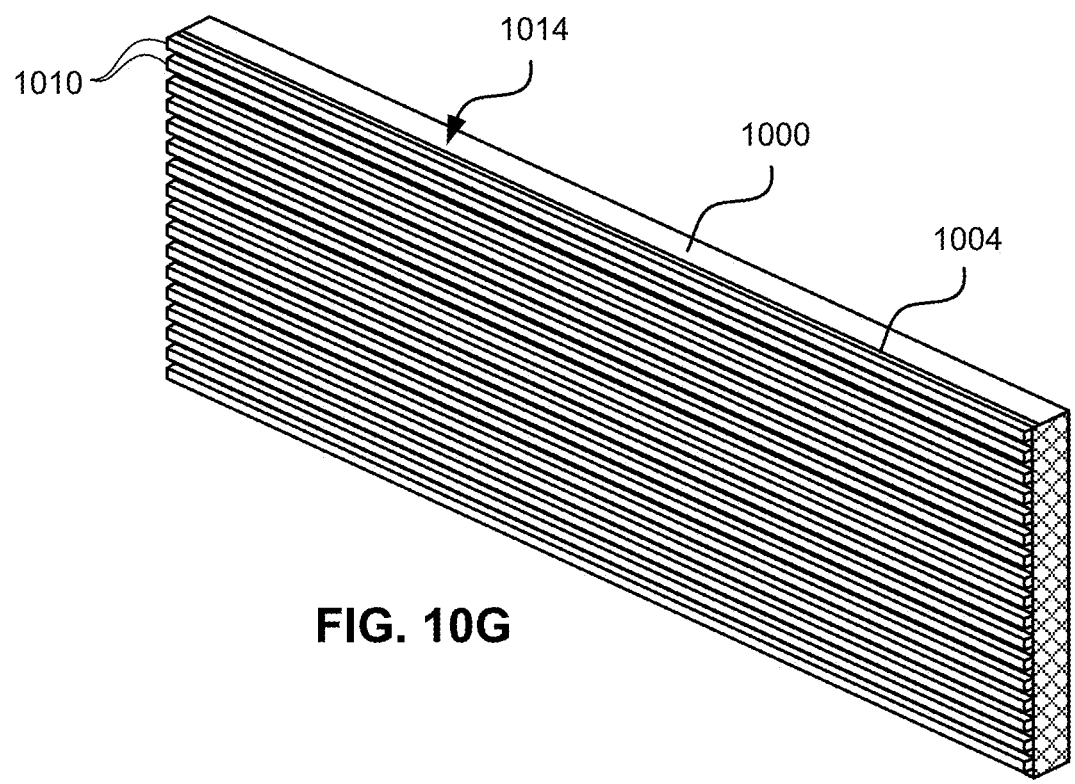
FIG. 10G is a perspective view of the section of wafer of FIG. 10F upon polishing an end thereof according to one embodiment.

FIG. 10G depicts the section 1000 with a polished end 1014. Once partially lapped, the polished surface of the end 1014 is amenable to use of optical detection techniques to identify features thereof. For example, features in the thin film layer 1004 are observable once the polishing is performed.

Optical detection of a reflective feature on the polished end may be used to determine a precise location for a bearing surface slot. Such reflective feature may be any optically discernable portion of the polished end. For example, the reflective portion may be a portion of the circuitry such as a shield, an electronic lapping guide, etc. that are now clearly discernable on the polished surface. In another approach, the reflective feature may be a fiducial built into the thin film layer 1004 at a predefined location. In yet another approach, the reflective feature may be a portion having a different color or contrast than an adjacent portion, e.g., the first layer or first few layers of the thin film layer on the substrate. Conventional optical detection techniques may be adapted for the purposes described herein, as would be appreciated by one skilled in the art upon reading the present disclosure. Machine vision techniques may be used. Preferably, the resolution of the optical detector is in the submicron level.

Figure 10H:
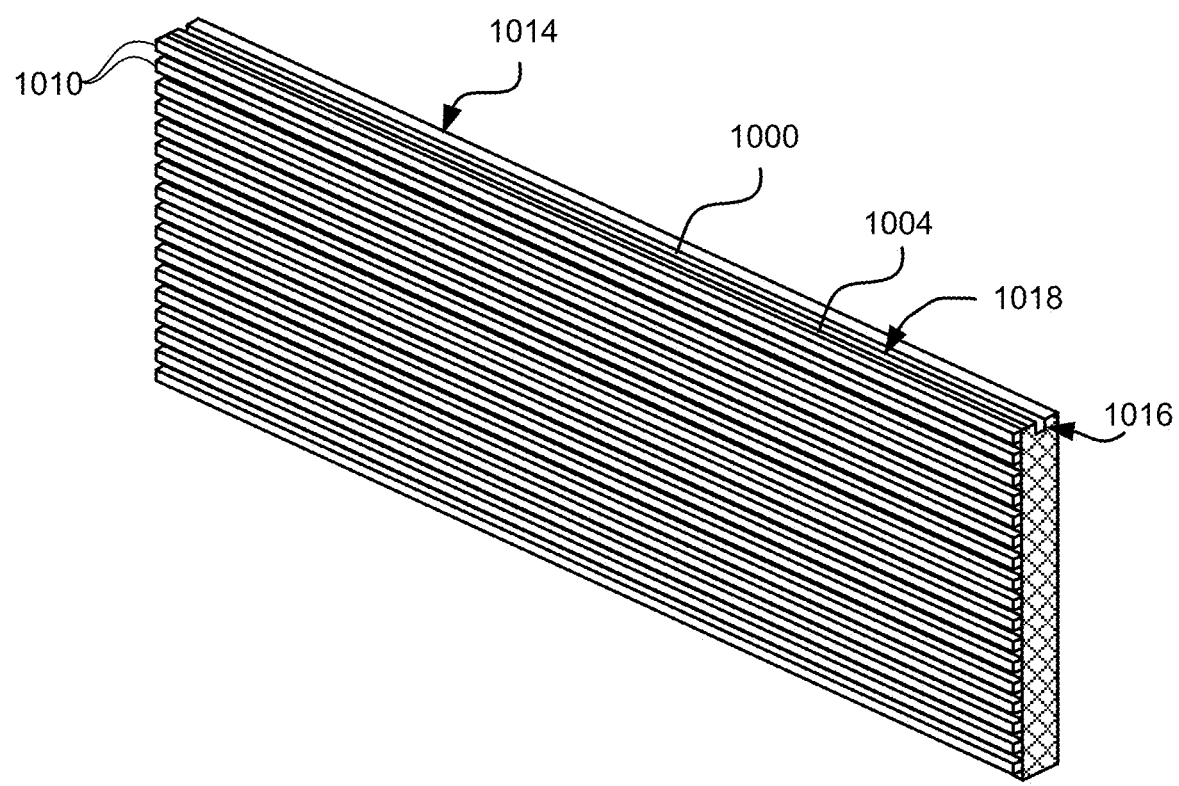
FIG. 10H is a perspective view of the section of wafer of FIG. 10G upon formation of a bearing surface slot in an end thereof according to one embodiment.

Using information derived from the optical detection, a bearing surface slot is formed at a precise location in the polished end. FIG. 10H illustrates the section 1000 having a bearing surface slot 1016 formed in the partially lapped end 1014 thereof. The bearing surface slot 1016 defines a tape bearing surface 1018 between the bearing surface slot and the thin film layer 1004. Where a portion of the circuitry exposed on the polished end is used as the optical landmark for the bearing surface slot positioning, the length of the tape bearing surface between the bearing surface slot and that portion of the circuitry may be very accurately defined.

Any conventional mechanism for forming the bearing surface slot may be used. For example, a conventional air bearing spindle saw with machine vision may be used to create the bearing surface slot at the proper location.

The depth of the bearing surface slot 1016 is preferably less than about 3 times a width thereof in a tape travel direction. This helps maintain the integrity of the resulting module. The width of the bearing surface slot is not as important, and generally depends on the width of the blade use to cut the bearing surface slot. For example, the depth of the bearing surface slot may be about 10 to about 20 microns deep, but could be higher or lower depending on the embodiment.

After formation of the bearing surface slot, the end 1014 of the section 1000 is lapped down to reduce the height of the polished end 1014 to about the desired tape bearing surface. This step preferably sets the approximate stripe height of the transducers, and removes any deformations caused by formation of the bearing surface slot, e.g., a bearing surface slot burr formed during formation of the bearing surface slot. Note that further lapping may be performed, where said subsequent lapping is minimally subtractive of the height of the polished end. For example, subtractive steps performed on the polished end after the second lapping step preferably remove no more than one-half micron of material, and ideally less than one quarter micron.

Figure 10I:
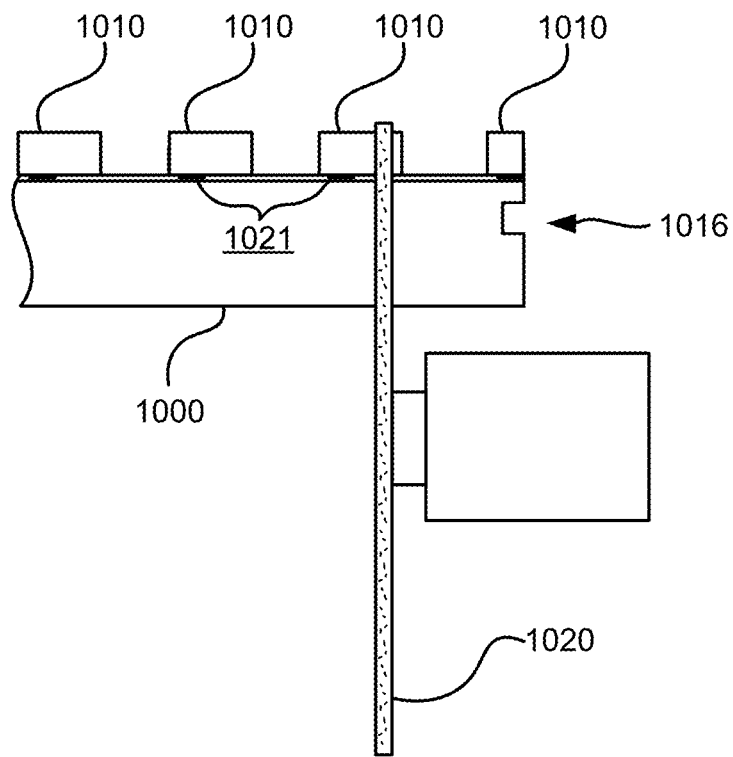
FIG. 10I is a side view depicting cutting of a row from a section of wafer according to one embodiment.

Referring to FIG. 10I, a row is then sliced from the section 1000. Transducers 1021 are also shown adjacent each closure 1010. Conventional cutting techniques may be used to slice the row from the section 1000. For example, a blade 1020 of conventional construction may be used to cut through the section 1000.

Figure 10J:
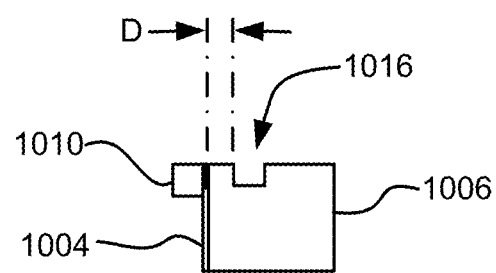
FIG. 10J is a side view of a row cut from a wafer according to one embodiment.
Figure 10K:
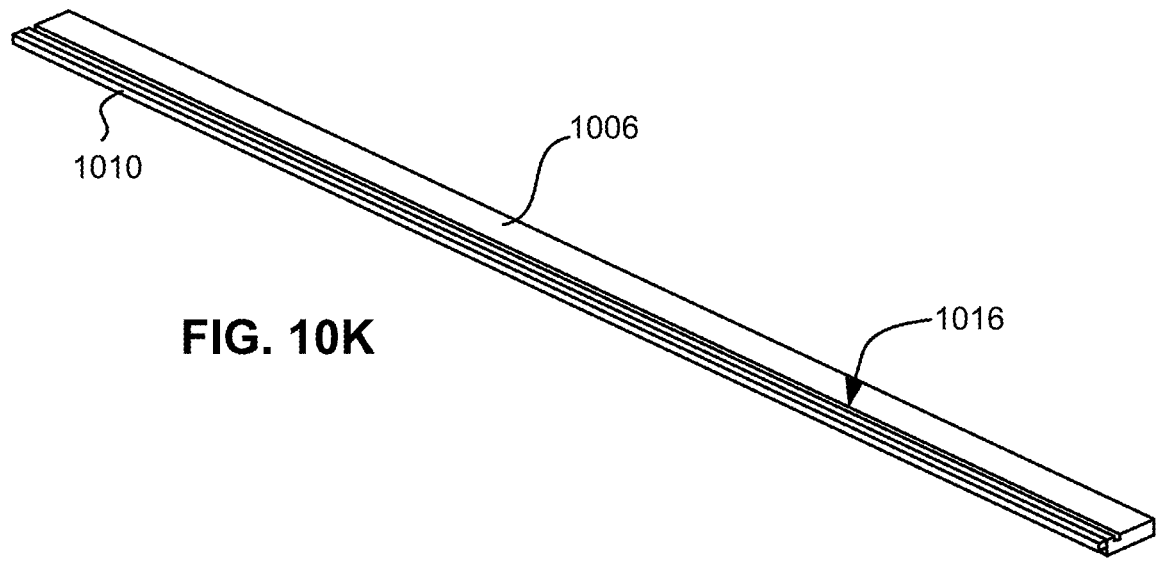
FIG. 10K is a perspective view of a row cut from a wafer after a back lap process to reduce a thickness thereof according to one embodiment.

FIG. 10J depicts the row cut from the section 1000. Various process steps may be performed on the row. For example, a back lapping step may be performed on the substrate 1006 to reduce its thickness, and/or to create a smooth bottom end for subsequent processing. FIG. 10K depicts the row after back lapping.

Figure 10L:
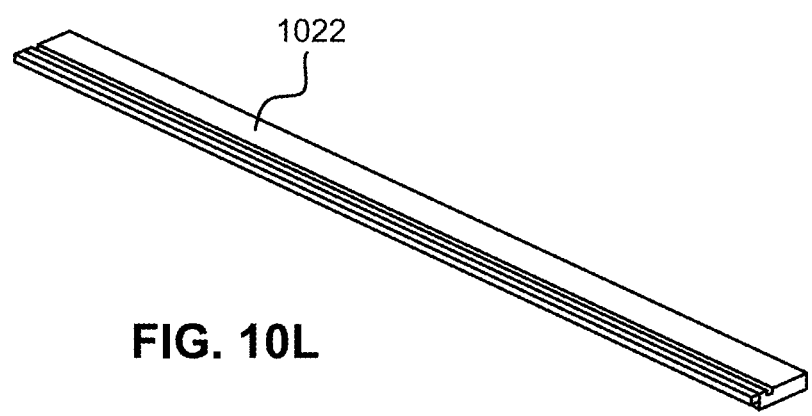
FIG. 10L is a perspective view of a chip cut from a row according to one embodiment.

If the row includes multiple head images, the row may be cut into chips. Preferably, the rows are cut into individual thin film elements, or chips 1022, using traditional methods. See FIG. 10L, which illustrates one chip 1022.

Figure 10M:
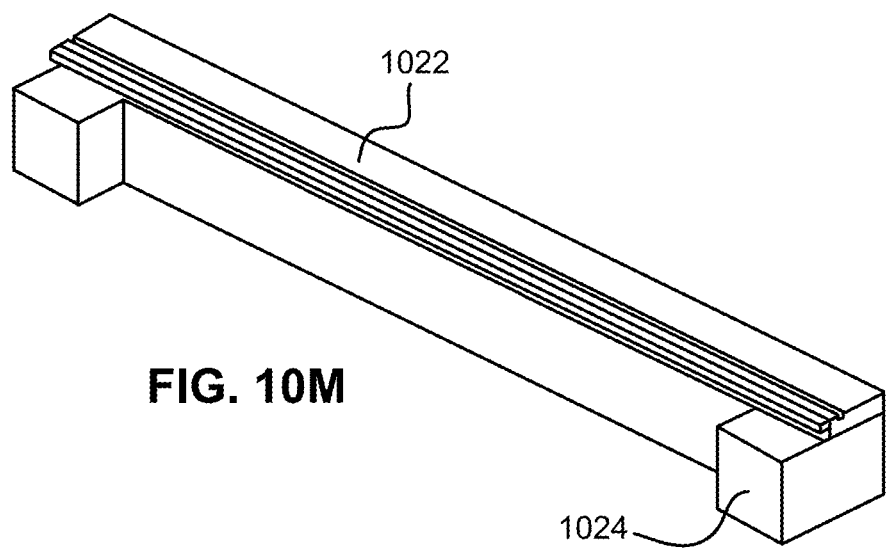
FIG. 10M is a perspective view of a U-beam with a chip coupled thereto, thereby forming a module according to one embodiment.

Each chip 1022 may be coupled to a beam such as a U-beam 1024, as shown in FIG. 10M. Various processes may be performed before or after coupling to the beam.

Additional processes may be performed, before or after the chip 1022 is coupled to a beam. For example, the row or chip may be lapped again, using conventional techniques such as KISS lapping on a charged plate, to provide a very smooth tape bearing surface. Milling may be performed, e.g., for preparing the polished surface for application of a protective overcoat thereto. An overcoat may be applied to the polished end.

Before or after the cutting, the portion of the polished end located on an opposite side of the bearing surface slot as the circuitry is removed using a conventional technique such as grinding, e.g., a taperless grind technique. FIG. 10N shows the chip 1022 upon removal of the material. Preferably, the removal extends along the bearing surface slot, thereby allowing the remaining portion of the bearing surface slot to define the skiving edge of the tape bearing surface of the chip.

Referring to FIGS. 10H and 10J, the bearing surface slot 1016 may be located a distance D of less than about 30 microns, and preferably between about 10 and about 20 microns, from the thin film layer 1004. This distance D, in combination with a wrap angle of a tape relative to the skiving edge of the bearing surface slot, is preferably short enough to induce tape tenting above the thin film layer 1004 when a tape passes above the thin film layer 1004. Accordingly, D is preferably less than about 50 microns. In some embodiments, D may be in a range of about 7 microns to about 30 microns. Such tape tenting may prevent asperities and other defects on the tape from engaging the thin film layer 1004 and causing damage thereto such as smearing of conductive material across the sensor, thereby creating a short.

Two or more beams 1024 may eventually be coupled together to form a head.

In use, the thin film elements created by the processes described herein can be used in magnetic recording heads for any type of magnetic media, including but not limited to disk media, magnetic tape, etc.

As shown in FIG. 10N, the chip 1022 is at least as wide as a tape for which the tape bearing surface is designed. However, other embodiments are contemplated. For example, shorter chip may be fabricated, as described immediately below.

According to various embodiments, the processes described herein may be used to form a partial span flat or contoured head "chip," the chip being embeddable in a flat or contoured beam, such that the chip closure extends beyond the beam edges. For example, the rows may be cut into individual partial span heads, or chips 1026, using traditional methods. See FIG. 10O, which illustrates a partial span flat profile chip 1026 according to a preferred embodiment. If the chip is to be used in a Linear Tape Open (LTO) head, the preferred length of the chip in a direction perpendicular to the direction of tape travel thereover is preferably less than about 7 to 8 mm, though larger or smaller sizes may be created as well.

Similar processes as those described above with reference to FIGS. 10A-10L may be used to form the chip 1026, with the exception of the length of chip cut from the section. Note also that chip 1026 includes the bearing surface slot 1016.

FIG. 10P illustrates a flat profile beam (carrier) 1028 according to one embodiment. One skilled in the art will understand that many different shapes of the beam can be used. For instance, the beam may be block shaped, e.g., have a generally rectangular cross section when viewed from the tape bearing surface. The beam may also include rounded and/or tapered portions. For simplicity and ease of understanding, the following description will be described with reference to a U-shaped beam, or U-beam.

With continued reference to FIG. 10P, the U-beam 1028 has a recess 1030 extending into a tape bearing surface 1032 thereof. The U-beam is preferably formed from a blank piece of wafer stock, which is inexpensive to fabricate, but is long enough to fully support the tape. If the U-beam is to be used in an LTO head, the preferred length of the U-beam in the same plane as, but in a direction perpendicular to, the direction of tape travel thereover is preferably less than about 50 mm, and ideally less than about 25 mm, but may be longer. Before the chip is affixed to the U-beam to form the module, the tape bearing surface on one of the U-beams may be lapped or polished to form a smooth tape bearing surface thereon.

Figure 10Q:
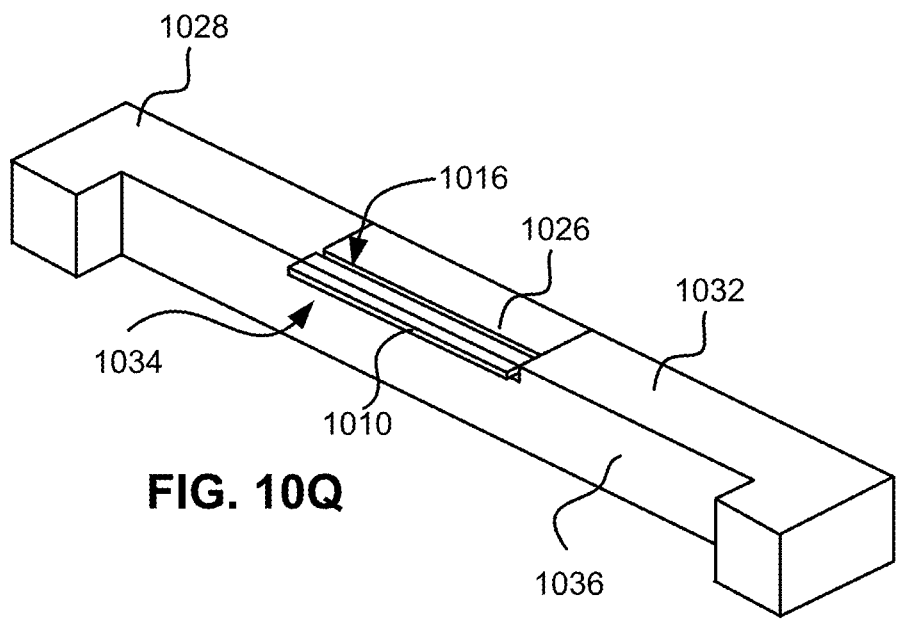
FIG. 10Q is a perspective view of a U-beam with a chip coupled thereto, thereby forming a module according to one embodiment.

As shown in FIG. 10Q, a chip 1026 is positioned in the recess of the U-beam such that the face 1034 of the substrate portion of the chip (which contains the device contact pads) is reasonably proximate to the adjacent face 1036 of the U-beam and coupled to the U-beam 1028 by any conventional technique, such as via an adhesive, such that the chip closure extends beyond the beam edges. This forms a module, which is later used to form a complete tape head. The geometry of the chip may be specifically adapted to minimize closure protrusion, and thereby minimize tape deflections effects.

The tape bearing surfaces (of the chip and U-beam) should be as parallel and coplanar as possible because the tape will run across them. However, the tape bearing surfaces do not need to be perfectly coplanar, as this design provides some tolerance for misalignment. Thus, the chip surface envelope may deviate from the tape bearing surface of the U-beam by several micrometers. This tolerance relief greatly reduces fabrication costs.

Figure 10R:
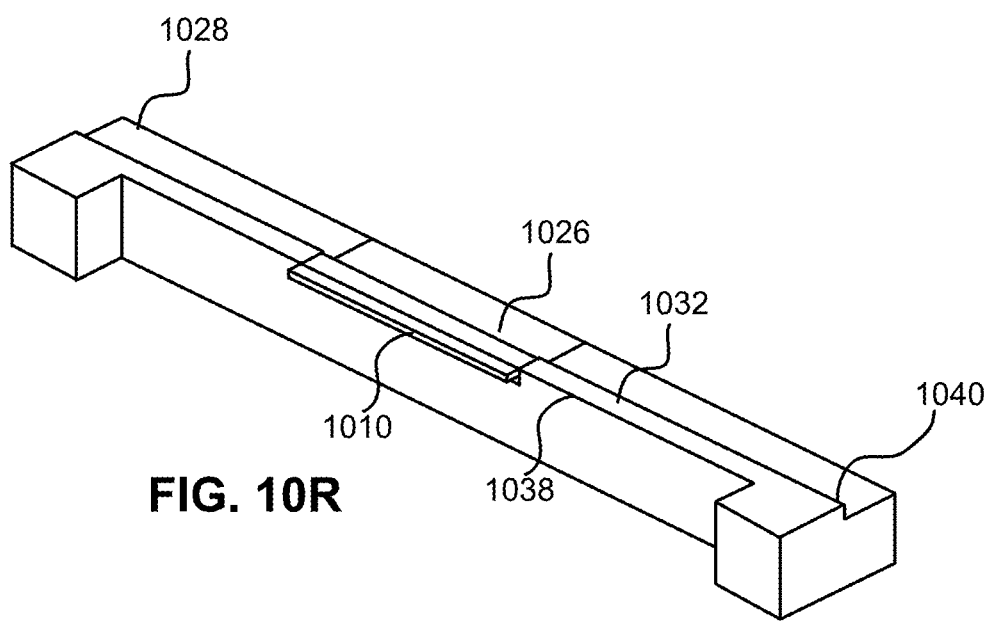
FIG. 10R is a perspective view of a module upon forming of a skiving edge thereon according to one embodiment.

As shown in FIG. 10R, the tape bearing surface of a U-beam 1028 can be processed (e.g., by grinding) to form a skiving edge 1040 thereon. The skiving edge 1040 is preferably formed as close to the remaining edge of the bearing surface slot as possible.

Two modules can be coupled together to form a head with spacing between the central portions of the beams, such as a head of the type shown in FIG. 1. Preferably skiving edges are formed on both modules to enable bi-directional reading and writing. In addition, the inside edges 1038 may be made sharp so that these will also skive air. Alternatively, the inside edges 1038 may be rounded if desired.

Preferably, the closures are angled upwardly into the tape bearing surface (i.e., as they approach each other, preferably at an angle between 0.1 to 2 degrees, with respect to the horizontal line between them. The angle of the closures may be used to create an air skiving effect for close head-tape spacing and/or to create a tenting effect.

Preferably, the wrap angle between the two modules creates the desired tenting over the read transducers.

All of the read and/or write elements in the head are preferably positioned in the chips. Note that each chip can have multiple read and write elements, such as interleaved read/write elements. Alternatively, one chip can have all write elements and the other chip can have all read elements. Other combinations are also possible. In this way, a read/write head can be formed.

Figure 10S:
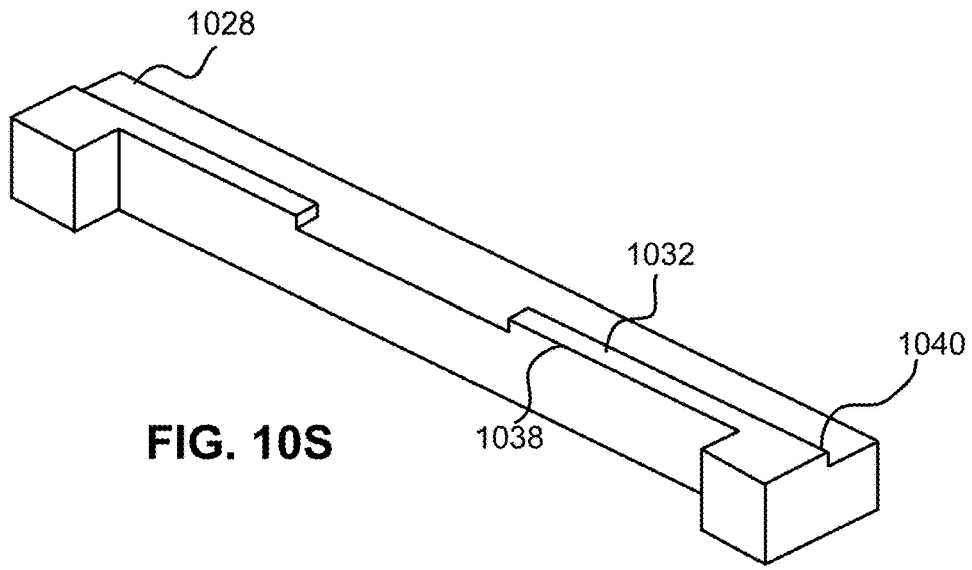
FIG. 10S is a perspective view of a U-beam according to one embodiment.
Figure 10T:
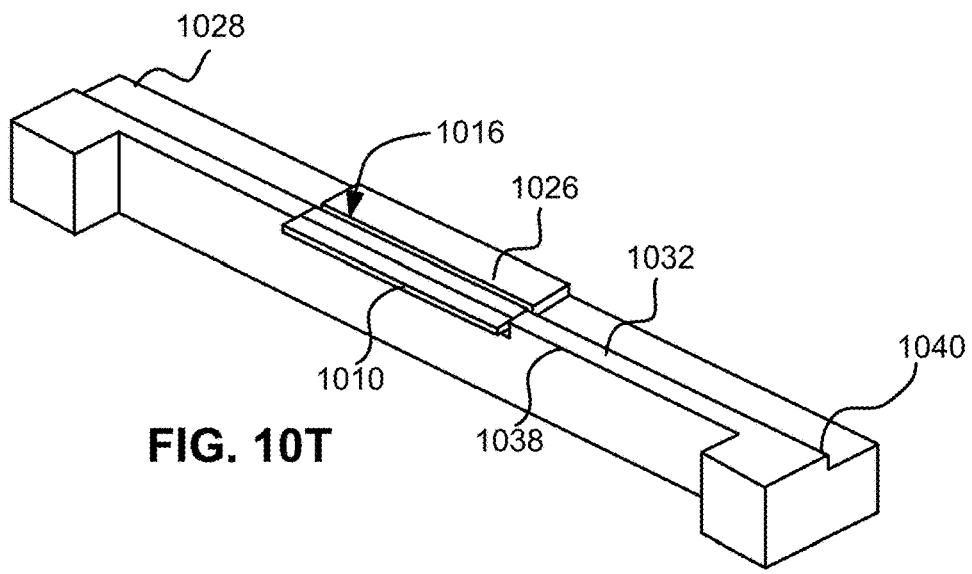
FIG. 10T is a perspective view of a U-beam with a chip coupled thereto, thereby forming a module according to one embodiment.
Figure 10U:
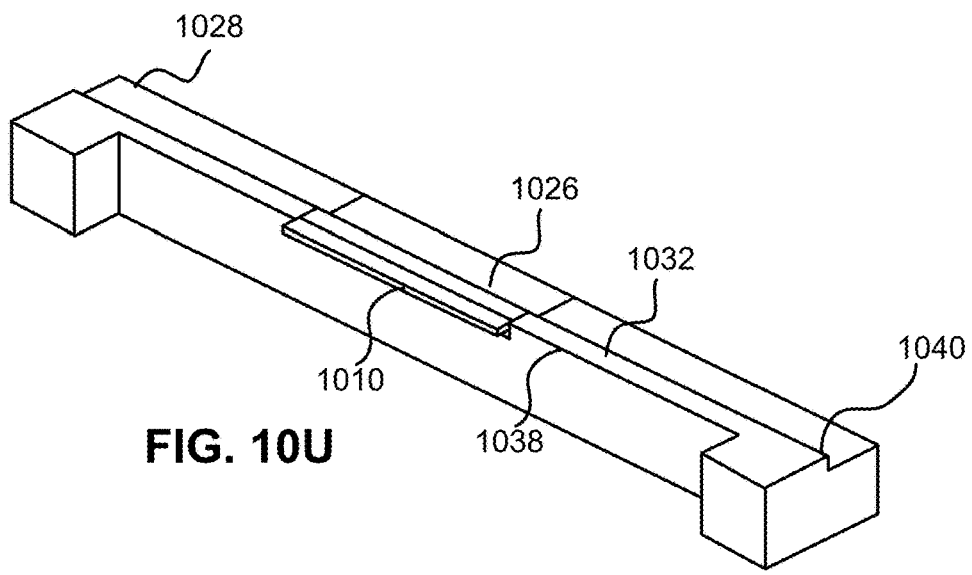
FIG. 10U is a perspective view of a module upon forming of a skiving edge thereon according to one embodiment.

FIGS. 10S-10U illustrate an alternate embodiment having components similar to those of FIGS. 10O-10R, and accordingly have common numbering therewith. As shown in FIG. 10S, the beam 1028 has a rear skiving edge 1040 already formed thereon. In FIG. 10T, the chip 1026 is coupled to the beam 1028. FIG. 10U shows the module after a portion of the chip 1026 behind the bearing surface slot is removed.

The heads created by the processes described herein can be used in magnetic recording heads for any type of magnetic media, including but not limited to disk media, magnetic tape, etc.

However, an important and continuing goal in the data storage industry is that of increasing the density of data stored on a medium. For tape storage systems, that goal has led to increasing the track and linear bit density on recording tape, as well as the pitch between transducers on magnetic heads used to write to and/or read from such recording tape. However, the development of increasingly smaller footprints, higher performance tape drive systems have created various problems in the design of a tape head assembly for use in such systems.

For instance, the process of manufacturing the magnetic heads and the transducers thereon has become increasingly difficult in view of the rising standards of performance. Many electronic components, including magnetic tape heads, are created by thin film wafer processing. Specifically, multiple magnetic tape heads are formed on a wafer, and each of the magnetic tape heads are cut from a remaining portion of the wafer. After being cut from the wafer, these magnetic tape heads have a closure coupled thereto and are implemented in a tape drive environment.

It is now understood that in the course of performing this manufacture procedure, the span of the array of transducers on the magnetic tape heads may vary significantly despite the array being formed on a same wafer, and despite significant efforts to ensure accuracy during the formation of the layers which make up the transducers.

Through extensive testing, the inventor has learned that wafers may have inhomogeneous internal stresses. The inventor has also learned that an amount by which the span in a completed magnetic head deviates from nominal may show correlation to location on the wafer on which the magnetic head was formed. In fact, spans in certain regions of the wafer are generally more dilated than other regions on the wafer. Thus, as the magnetic heads are cut from the wafer, internal stresses are released, causing the layers therein to deform from their intended orientation with respect to each other, including pitch between adjacent ones of the transducers. Similarly, the result of coupling a closure is believed to possibly provide an additional set of stresses which further effects this deformation.

However, the embodiments included herein are intended to reduce the effect of pitch between transducers of magnetic tape head modules caused by contractions and/or expansions due to relief of stresses when the modules are cut from their respective wafers. In other words, some of the embodiments herein are able to at least partially isolate the transducers from dimensional instabilities of the closure and/or substrate, thereby achieving a more uniform (e.g., stable) pitch between adjacent ones of the transducers, e.g., as will be described in further detail below.

Figure 11A:
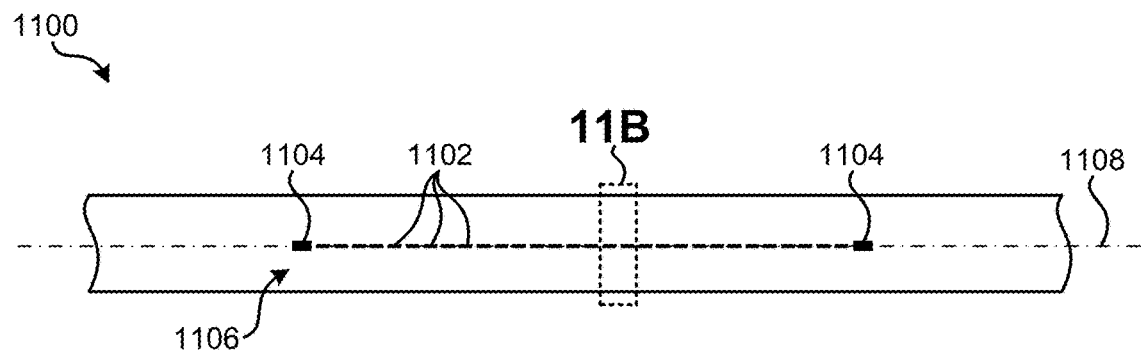
FIG. 11A is a partial representational view of a magnetic tape head module according to one embodiment.
Figure 11B:
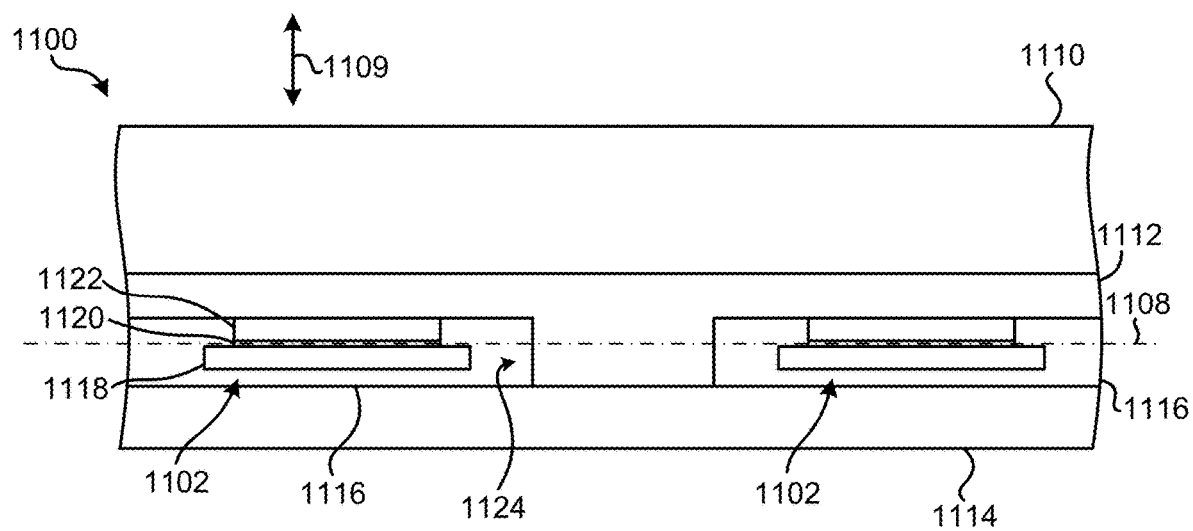
FIGS. 11B-11C are detailed views of the magnetic tape head module in FIG. 11A, taken along line 11B, according to two embodiments.

Looking now to FIGS. 11A-11B, a magnetic tape head module 1100 is illustrated in accordance with one embodiment. As an option, the present magnetic tape head module 1100 may be implemented in conjunction with features from any other embodiment listed herein, such as those described with reference to the other FIGS. However, such magnetic tape head module 1100 and others presented herein may be used in various applications and/or in permutations which may or may not be specifically described in the illustrative embodiments listed herein. Further, the magnetic tape head module 1100 presented herein may be used in any desired environment. Thus FIGS. 11A-11B (and the other FIGS.) may be deemed to include any possible permutation.

The magnetic tape head module 1100 includes a plurality of transducers 1102, 1104 which are positioned in an array 1106 which extends along a longitudinal length of the magnetic tape head module 1100. With respect to the present description, the longitudinal length of the magnetic tape head module 1100 extends in a direction which is parallel to the longitudinal axis 1108 of the magnetic tape head module 1100.

The plurality of transducers includes servo readers 1104 as well as data transducers 1102 which may include data readers and/or data writers depending on the approach. Moreover, looking to FIG. 11B, two of the data transducers 1102 are illustrated in further detail. As shown, the magnetic tape head module 1100 includes a substrate 1114 and/or substrate layers, an elastic encapsulation layer 1112 coupled thereto, and a closure 1110 and/or closure layers coupled to at least a portion of the encapsulation layer 1112. However, it should be noted that while certain ones of the layers are described herein as being coupled to each other, note that additional layers may be present. Moreover, unless otherwise specified, the various layers in this and other embodiments may be formed using conventional processes.

The array of transducers 1102 is depicted as being at least partially surrounded by the encapsulation layer 1112, despite also being at least partially encased in an electrically insulative material 1116, e.g., such as alumina. The electrically insulative material 1116 may contact the layers 1118, 1120, 1122 in the structure of the transducers 1102, thereby enabling the transducers 1102 to function properly in reading data from and/or writing data to a magnetic tape, e.g., as would be appreciated by one skilled in the art after reading the present description. The layers 1118, 1120, 1122 in the structure of the transducers 1102 vary depending on the type of transducer. However, according to an exemplary approach, which is in no way intended to limit the invention, the transducers 1102 are TMR sensors which include a first shield layer 1118, a second shield layer 1122, and a tunnel barrier structure 1120 positioned therebetween.

The encapsulation layer 1112 preferably includes a compliant, deformable material which is configured to deform when subjected to external forces to dampen the forces exerted on the plurality of transducers 1102 by the closure 1110, substrate 1114, and/or any other layers in the magnetic tape head module 1100 as a result of dimensional instabilities thereof. For example, cutting a conventional magnetic tape head from a wafer during the manufacture process causes internal stresses therein to be released, thereby causing the transducers to shift from their intended orientation with respect to each other, including the pitch between adjacent ones of the transducers. Moreover, as mentioned above, the coupling a closure to the wafer may introduce an additional set of unique stresses which further effects this deformation experienced absent the elastic encapsulation layer 1112.

A portion of the encapsulation layer 1112 is shown as being positioned directly between the array of transducers 1102 and the closure 1110. A portion 1124 of the encapsulation layer 1112 is also illustrated as extending toward the substrate 1114 between adjacent ones of the transducers 1102 in the array. In other words, portions 1124 of the encapsulation layer 1112 extend toward the substrate such that they overlap (e.g., intersect) crossing planes of deposition of the transducer layers 1118, 1120, 1122.

As mentioned above, the encapsulation layer 1112 is for damping forces exerted on the plurality of transducers 1102 by the closure 1110, substrate 1114, and/or other layers in the magnetic tape head module 1100 as a result of dimensional instabilities thereof, e.g., after being cut off from a wafer. Again, in order to achieve this functionality, the encapsulation layer 1112 preferably includes a compliant, deformable material configured to deform when subjected to external forces. It follows that the compliant, deformable material is at least more ductile than the closure 1110 and the substrate 1114. Thus, any forces exerted on the encapsulation layer 1112 as a result of one or both of the closure 1110 and substrate 1114 expanding and/or contracting along the longitudinal axis 1108 of the magnetic tape head module 1100, the deposition direction 1109, and/or the height direction which extends into the page perpendicular to the plane formed by the longitudinal axis 1108 and the deposition direction 1109, are dampened (e.g., muted) by the compliant, deformable properties the encapsulation layer 1112 possesses.

For instance, the portion of the encapsulation layer 1112 positioned directly between the array of transducers 1102 and the closure 1110 desirably serves as a buffer for the dimensional stability of the transducers 1102. As the closure 1110 expands, contracts, twists, etc. over time as a result of changes in temperature, humidity, etc., the encapsulation layer 1112 serves to dampen the effect that these forces have on the array of transducers 1102, depending on other aspects of the design of the head, e.g., such as specifics of the insulation films. Similarly, the portions 1124 of the encapsulation layer 1112 which extend toward the substrate 1114 directly between adjacent ones of the transducers 1102 are able to dampen the effects that the substrate 1114 has on the transducers 1102 as the substrate expands, contracts, twists, etc. over time as a result of changes in temperature, humidity, etc.

Thus, an encapsulation layer 1112 which includes one or more materials which are able to dampen the effect that these forces have on the position and/or orientation of each of the transducers 1102 with respect to each other serves to achieve more consistent pitch between adjacent ones of the transducers 1102 despite dimensional shifts in the layers of the magnetic tape head module 1100. As a result, the magnetic tape head module 1100 will be able to read and/or write more efficiently and with fewer errors, thereby reducing latency, increasing throughput, etc.

The dimensions, general shape, process of forming, etc. the encapsulation layer 1112 and/or the different portions thereof vary depending on the desired approach. For instance, in some approaches the portion of the encapsulation layer 1112 positioned directly between the array of transducers 1102 and the closure 1110 is formed full film, after one or more masks are first used to form the portions 1124 of the encapsulation layer 1112. However, in other approaches the encapsulation layer 1112 is formed in a single full film deposition process, after which a removal process (e.g., such as etching) is performed in order to create recesses which actually define the portions 1124 which extend from the substrate 1114 directly between each of the recesses.

As mentioned above, the encapsulation layer 1112 preferably includes a compliant, deformable material configured to deform when subjected to external forces. It follows that the compliant, deformable material is at least more ductile than the closure 1110 and the substrate 1114. In some approaches the compliant, deformable material includes a polymer, e.g., such as a hard-baked photoresist, or any other type of polymer which would be apparent to one skilled in the art after reading the present description. In other approaches, the compliant, deformable material includes aluminum, or any other type of high ductility metal which again is preferably at least more ductile than the closure 1110 and the substrate 1114, and which would be apparent to one skilled in the art after reading the present description.

Figure 11C:
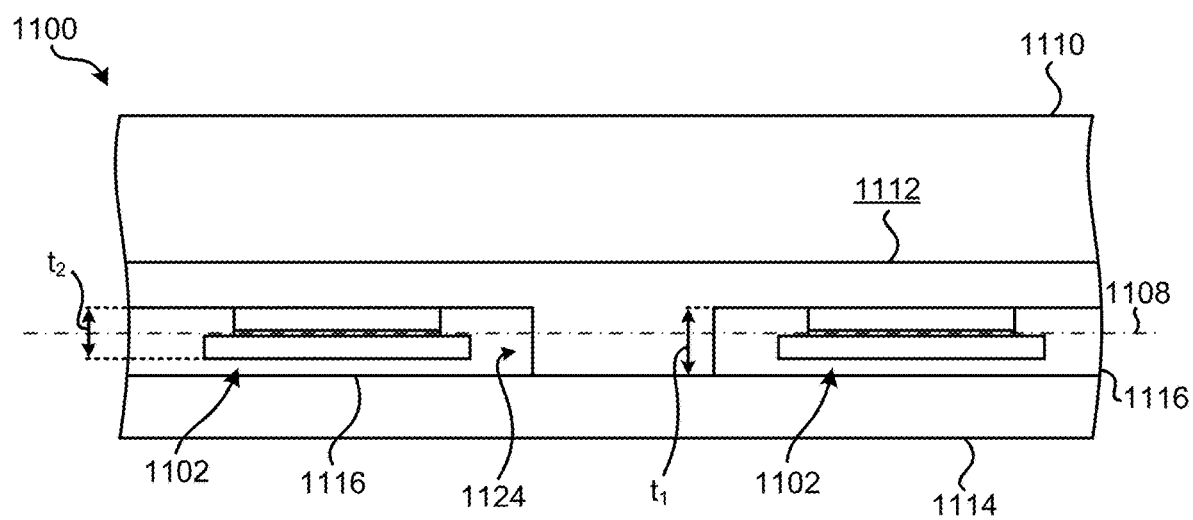

Looking to FIG. 11C, the detailed view of the two data transducers 1102 shown in FIG. 11B is reproduced in order to illustrate several dimensional characteristics of the layers in the magnetic tape head module 1100. Again, the dimensions, general shape, process of forming, etc. the encapsulation layer 1112 and/or the different portions thereof vary depending on the desired approach. For instance, in preferred approaches, a thickness $t_1$ of each of the portions 1124 of the encapsulation layer extending toward the closure directly between adjacent transducers in the array is at least greater than a thickness $t_2$ of each of the transducers measured along the deposition direction 1109 thereof. The portions 1124 of the encapsulation layer extending between the transducers 1102 are thereby able to contact the closure 1110 in addition to the substrate 1114, effectively decoupling the transducers 1102 therefrom.

Moreover, a total width of the encapsulation layer 1112 measured in a direction parallel to the longitudinal axis 1108 of the magnetic tape head module 1100 may be about equal to a width of the array of transducers. In other words, the portion of the encapsulation layer 1112 positioned directly between the array of transducers 1102 and the closure 1110 is as wide as the width of the array itself in some approaches. However, in other approaches, the width of the encapsulation layer 1112 is wider than a width of the array of transducers 1102. In other words, the portion of the encapsulation layer 1112 positioned directly between the array of transducers 1102 and the closure 1110 is at least as wide as the distance separating outermost ones of the transducers in the array (e.g., see 1106 in FIG. 11A).

Figure 12A:
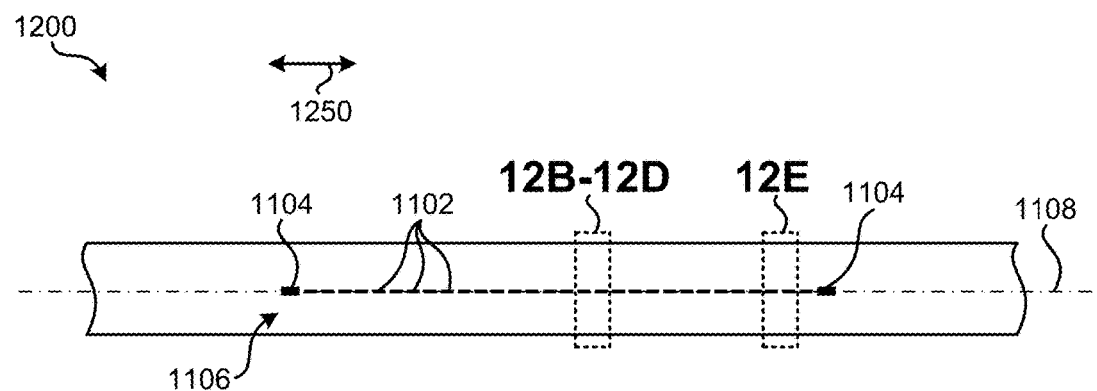
FIG. 12A is a partial representational view of a magnetic tape head module according to one embodiment.
Figure 12B:
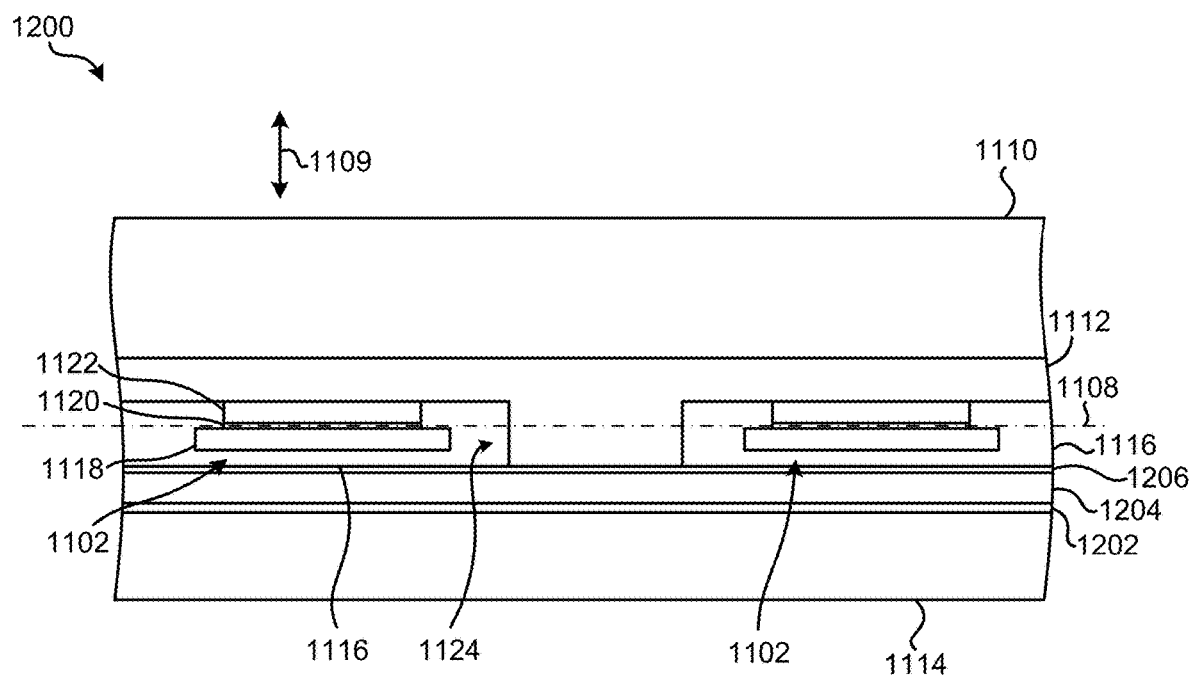
FIGS. 12B-12D are detailed views of the magnetic tape head module in FIG. 12A, taken along line 12B-12D, according to three embodiments.

Looking now to FIGS. 12A-12B, a magnetic tape head module 1200 is illustrated in accordance with one embodiment. As an option, the present magnetic tape head module 1200 may be implemented in conjunction with features from any other embodiment listed herein, such as those described with reference to the other FIGS. However, such magnetic tape head module 1200 and others presented herein may be used in various applications and/or in permutations which may or may not be specifically described in the illustrative embodiments listed herein. Further, the magnetic tape head module 1200 presented herein may be used in any desired environment. Specifically, FIGS. 12A-12B illustrate variations of the embodiment of FIGS. 11A-11C depicting several exemplary configurations within the magnetic tape head module 1200. Accordingly, various components of FIGS. 12A-12B have common numbering with those of FIGS. 11A-11C. Moreover, FIGS. 12A-12B (and the other FIGS.) may be deemed to include any possible permutation.

The magnetic tape head module 1200 includes a plurality of transducers 1102, 1104 which are positioned in an array 1106 that extends along a longitudinal length of the magnetic tape head module 1200. With respect to the present description, the longitudinal length of the magnetic tape head module 1200 extends in the cross-track direction 1250 which is substantially parallel to the longitudinal axis 1108 of the magnetic tape head module 1200.

The plurality of transducers includes servo readers 1104 as well as data transducers 1102 which may include data readers and/or data writers depending on the approach. Moreover, looking to FIG. 12B, two of the data transducers 1102 are illustrated in further detail. As shown, the magnetic tape head module 1200 includes a substrate 1114 and/or substrate layers, which includes an undercoat 1202 that is coupled thereto. In some approaches the undercoat includes alumina, but may include any other material which would be apparent to one skilled in the art after reading the present description.

A first encapsulation layer 1204 is positioned between the undercoat 1202 and a base layer 1206. In some approaches, the base layer 1206 may include alumina. Moreover, the first encapsulation layer 1204 preferably includes a compliant, deformable material, e.g., as will be described in further detail below. A portion of a second encapsulation layer 1112 is also coupled to the base layer 1206, and a closure 1110 and/or closure layers are further coupled to at least a portion of the second encapsulation layer 1112. However, it should be noted that while certain ones of the layers are described herein as being coupled to each other, note that additional layers may be present. Moreover, unless otherwise specified, the various layers in this and other embodiments may be formed using conventional processes.

The array of transducers 1102 is depicted as being sandwiched between at least a portion of the second encapsulation layer 1112 and the base layer 1206, despite also being at least partially surrounded by an electrically insulative material 1116. The array of transducers 1102 is similarly sandwiched between at least a portion of the first encapsulation layer 1204 and the closure 1110. As noted above, the electrically insulative material 1116 at least partially surrounds the layers 1118, 1120, 1122 in the structure of the transducers 1102, thereby enabling the transducers 1102 to function properly in reading data from and/or writing data to a magnetic tape, e.g., as would be appreciated by one skilled in the art after reading the present description.

The first encapsulation layer 1204 preferably includes a compliant, deformable first material, and the second encapsulation layer 1112 preferably includes a compliant, deformable second material. Each of the compliant, deformable first material and the compliant, deformable second material are preferably configured to deform when subjected to external forces. Accordingly, the first and second encapsulation layers 1204, 1112 dampen forces exerted on the plurality of transducers 1102 by the closure 1110, substrate 1114, and/or any other layers in the magnetic tape head module 1200 as a result of dimensional instabilities thereof. As mentioned above, cutting a conventional magnetic tape head from a wafer during the manufacture process causes internal stresses therein to be released, thereby causing the transducers to shift from their intended orientation with respect to each other, including the pitch between adjacent ones of the transducers. Moreover, as mentioned above, coupling a closure to the wafer may introduce an additional set of unique stresses which further effects this deformation experienced absent the first and/or second encapsulation layers 1204, 1112.

It follows that the compliant, deformable material and the compliant, deformable second material are each more ductile than the substrate 1114 in preferred approaches. An illustrative list of compliant, deformable materials, any one or more of which may be included in the first and/or second encapsulation layers 1204, 1112 includes, but is in no way limited to, a polymer, e.g., such as a hard-baked photoresist; aluminum, or other metal which again is preferably at least more ductile than the closure 1110 and/or the substrate 1114; etc., or any other deformable materials which would be apparent to one skilled in the art after reading the present description.

Again, the dimensions, general shape, forming process, etc., of the first and/or second encapsulation layers 1204, 1112 vary depending on the desired approach. For instance, in some approaches the first and/or second encapsulation layers 1204, 1112 are laminate structures, each of the laminate structures including two or more sub-layers. An encapsulating layer having a laminate structure may be desirable in some approaches as different materials may be included in each of the sub-layers, thereby resulting in a composite layer which may be able to exhibit more desirable characteristics. For example, a compliant, deformable first material included in at least one of the sub-layers of the laminate structure may be structurally stable, but also a relatively poor thermal conductor. Accordingly, a compliant, deformable second material with more favorable thermal conducting properties may be included in at least another of the sub-layers of the laminate structure. As a result, the laminate structure allows for the composite layer to exhibit favorable structural stability as well as favorable thermal conductivity properties despite including one or more sub-layers which include a material which is a relatively poor thermal conductor.

Figure 12C:
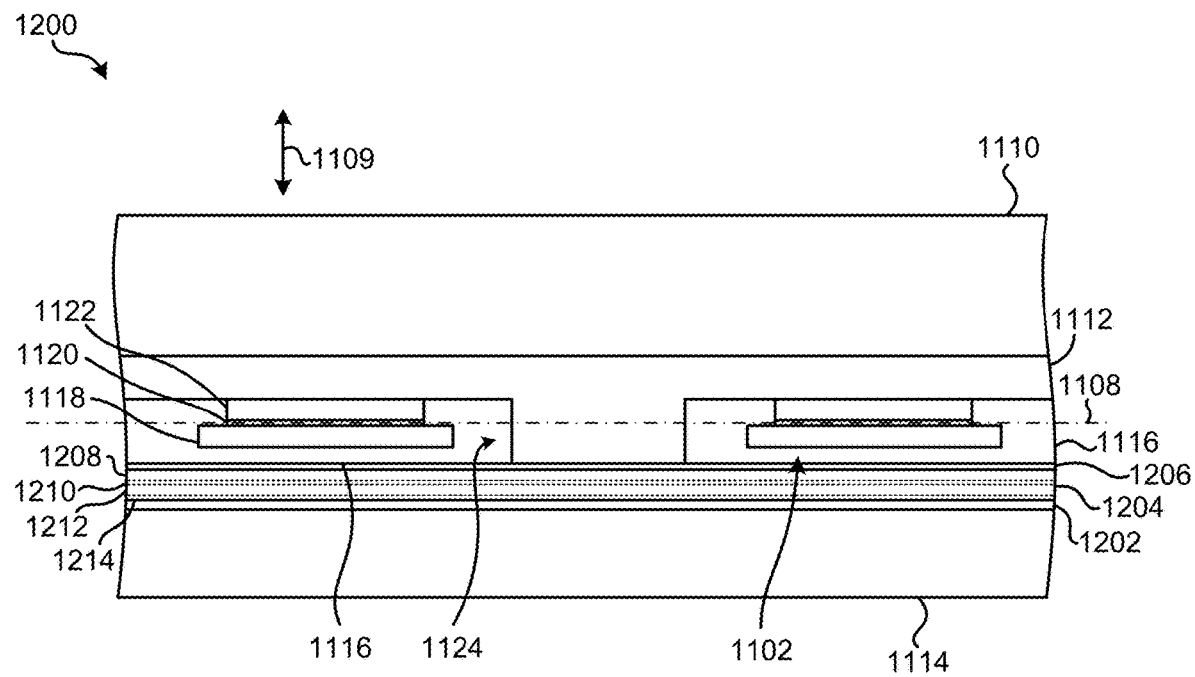

Referring momentarily to FIG. 12C, a variation of the magnetic tape head module 1200 depicted in FIGS. 12A-12B is illustrated in which the first encapsulation layer 1204 is a laminate structure. Specifically, the first encapsulation layer 1204 is a laminated structure having a plurality of sub-layers 1208, 1210, 1212, 1214. Each of the sub-layers 1208, 1210, 1212, 1214 preferably includes a compliant, deformable material which may be the same, similar or different among the different sub-layers 1208, 1210, 1212, 1214. According to an example, a portion of the sub-layers 1208, 1212 include a photoresist, while a remainder of the sub-layers 1210, 1214 include aluminum.

Figure 12D:
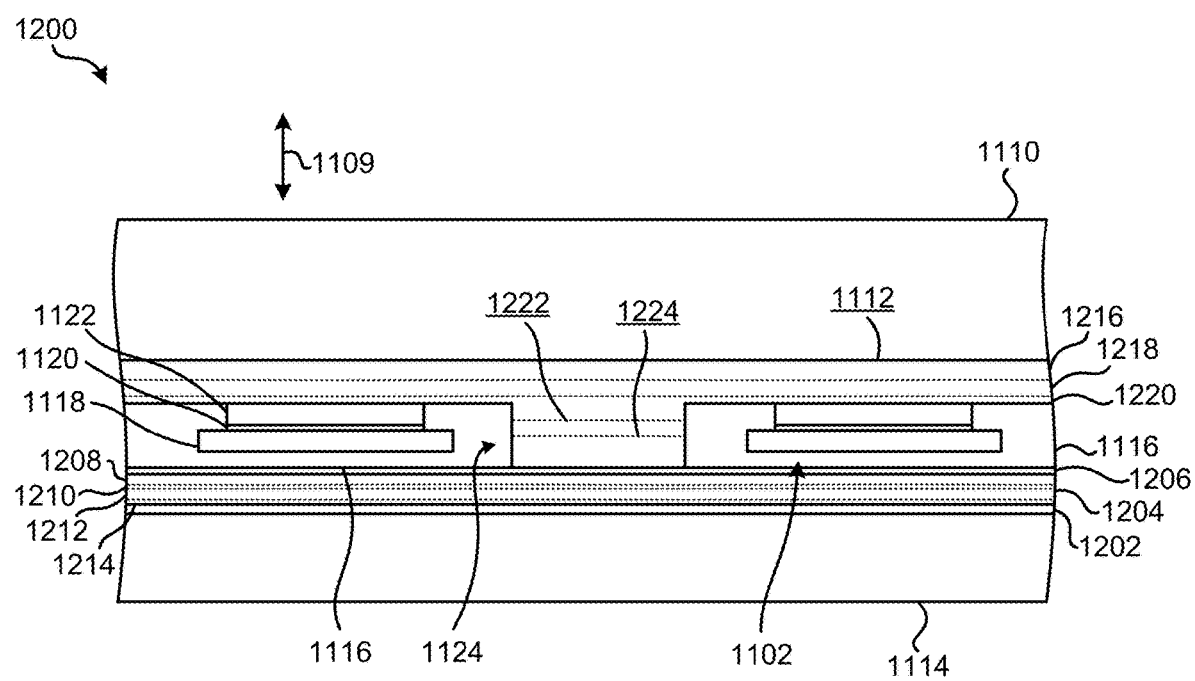

Looking now to FIG. 12D, another variation of the magnetic tape head module 1200 depicted in FIGS. 12A-12B is illustrated in which the first and second encapsulation layers 1204, 1112 are each a laminate structure. Accordingly, the first encapsulation layer 1204 is a laminated structure having a plurality of sub-layers 1208, 1210, 1212, 1214, while the second encapsulation layer is also a laminated structure having a plurality of sub-layers 1216, 1218, 1220,

1222, 1224. Again, any one or more of the sub-layers may include the same, similar or different compliant, deformable materials as any of the other sub-layers included in the magnetic tape head module 1200.

It should also be noted that the dimensions, orientations, numbers, etc. of the various sub-layers may vary, e.g., depending on the desired approach. Similarly, the dimensions of the first and/or second encapsulation layers 1204, 1112 may vary as well. For instance, in some approaches only some of the plurality of transducers are sandwiched between at least a portion of the first encapsulating layer and the substrate.

Figure 12E:
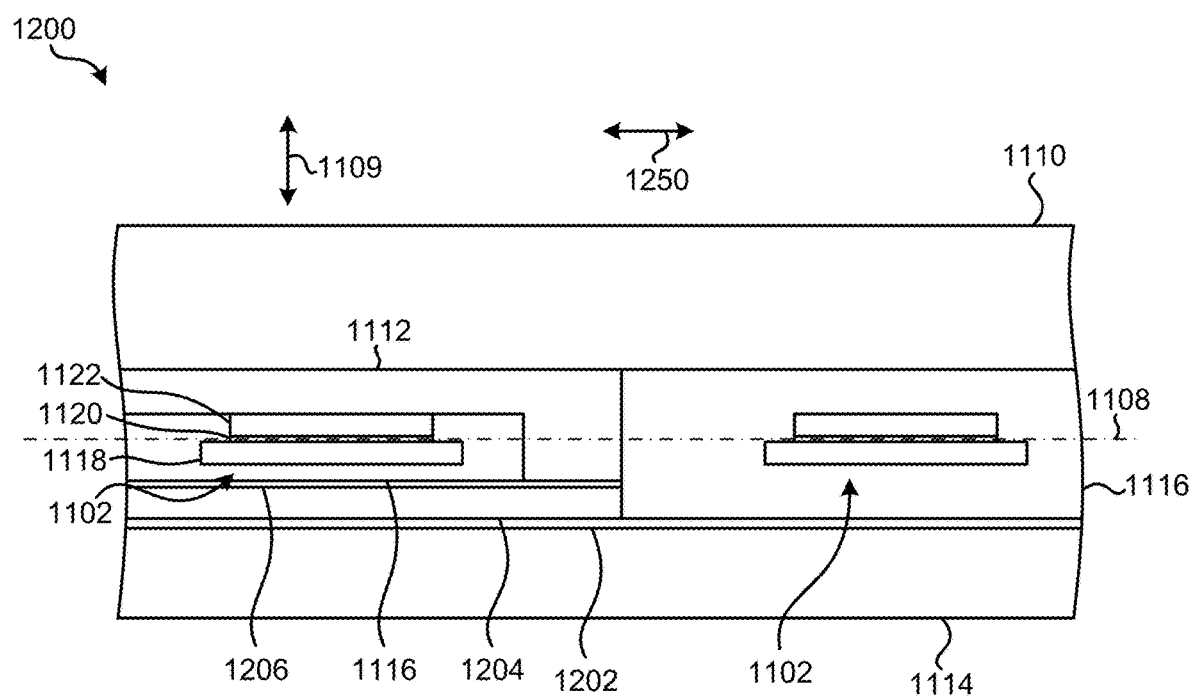
FIG. 12E is a detailed view of the magnetic tape head module in FIG. 12A, taken along line 12E, according to one embodiment.

Referring momentarily now to FIGS. 12E-12F, a variation of the magnetic tape head module 1200 depicted in FIGS. 12A-12B is illustrated in which only some of the plurality of transducers 1102 are sandwiched directly between the first and second encapsulation layers 1204, 1112. Two of the data transducers 1102 in FIG. 12A which are located in an outer region of the array 1106 (e.g., closer to the servo readers 1104 along the cross-track direction 1250) are illustrated in further detail in FIG. 12E. Looking specifically to FIG. 12E, the left transducer 1102 is sandwiched directly between the first and second encapsulation layers 1204, 1112, while the transducer 1102 on the right is proximate to the electrically insulative material 1116 and sandwiched directly between the substrate 1114 and closure 1110. It follows that a length of the first and/or second encapsulation layers 1204, 1112 measured along the cross-track direction 1250 may be less than a length of the transducer array 1106 measured along the same direction in some approaches.

It follows that the various embodiments included herein are able to able to insulate the transducers from the forces caused by dimensional instabilities of the closure and/or substrate. Specifically, by implementing an encapsulation layer which includes one or more materials which are able to dampen the effect that these forces have on the position and/or orientation of each of the transducers with respect to each other, the encapsulation layer is able to achieve a consistent and stable pitch between adjacent ones of the transducers despite dimensional shifts in the layers of a magnetic tape head module. As a result, some of the embodiments above are able to read and/or write more efficiently and with fewer errors, thereby improving the position error signal during use, reducing latency, increasing throughput, etc. However, it should again be noted that the dimensions, general shape, process of forming, etc. the encapsulation layer and/or the different portions thereof vary depending on the desired approach. Accordingly, the embodiments presented herein are in no way intended to limit the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    a magnetic tape head module having:
        a substrate;
        an encapsulation layer which includes a compliant, deformable material;
        a closure; and
        a plurality of transducers positioned in an array along a longitudinal length of the magnetic tape head module,
        wherein the array of transducers is sandwiched between at least a portion of the encapsulation layer and the substrate,
        wherein a portion of the encapsulation layer extends toward the substrate directly between adjacent transducers in the array.

2. The apparatus as recited in claim 1, wherein the encapsulation layer is configured to dampen forces exerted on the plurality of transducers by the closure and/or substrate as a result of dimensional instabilities of the closure and/or substrate.

3. The apparatus as recited in claim 2, wherein the compliant, deformable material is more ductile than the substrate.

4. The apparatus as recited in claim 3, wherein the compliant, deformable material includes a polymer.

5. The apparatus as recited in claim 4, wherein the compliant, deformable material includes a photoresist.

6. The apparatus as recited in claim 3, wherein the compliant, deformable material includes aluminum.

7. The apparatus as recited in claim 1, wherein a thickness of each portion of the encapsulation layer extending toward the substrate directly between adjacent transducers in the array is greater than a thickness of any of the adjacent transducers, respectively.

8. The apparatus as recited in claim 1, wherein a width of the encapsulation layer is at least as wide as a width of the array of transducers.

9. The apparatus as recited in claim 1, wherein a width of the encapsulation layer is greater than a width of the array of transducers.

10. The apparatus as recited in claim 1, comprising:
    a drive mechanism for passing a magnetic medium over the magnetic tape head module; and
    a controller electrically coupled to the magnetic tape head module.

11. A tape drive, comprising:
a magnetic tape head;
a drive mechanism for passing a magnetic medium over the magnetic tape head; and
a controller electrically coupled to the magnetic tape head, wherein the magnetic tape head includes:
a module having:
a substrate;
a first encapsulation layer which includes a compliant, deformable material;
a closure; and
a plurality of transducers positioned in an array along a longitudinal length of the magnetic tape head module,
wherein the array of transducers is sandwiched between at least a portion of the first encapsulation layer and the closure.

12. The tape drive as recited in claim 11, comprising:
a second encapsulation layer which includes a compliant, deformable second material,
wherein the array of transducers is sandwiched between at least a portion of the second encapsulation layer and the substrate,
wherein a portion of the second encapsulation layer extends toward the substrate directly between adjacent transducers in the array.

13. The tape drive as recited in claim 12, wherein the first and second encapsulation layers are configured to dampen forces exerted on the plurality of transducers by the closure and/or substrate as a result of dimensional instabilities of the closure and/or substrate.

14. The tape drive as recited in claim 13, wherein the compliant, deformable material and the compliant, deformable second material are each more ductile than the substrate.

15. The tape drive as recited in claim 14, wherein the compliant, deformable material includes a photoresist and/or aluminum.

16. An apparatus, comprising:
a magnetic tape head module having:
a substrate;
a first encapsulation layer which includes a compliant, deformable material;
a closure; and
a plurality of transducers positioned in an array along a longitudinal length of the magnetic tape head module,
wherein at least some of the plurality of transducers are sandwiched between at least a portion of the first encapsulation layer and the substrate,
wherein a portion of the first encapsulation layer extends toward the substrate directly between adjacent transducers in the array.

17. The apparatus as recited in claim 16, wherein the first encapsulation layer is configured to dampen forces exerted on the plurality of transducers by the closure and/or substrate as a result of dimensional instabilities of the closure and/or substrate.

18. The apparatus as recited in claim 17, wherein the first encapsulation layer is a laminate structure which includes two or more sub-layers, wherein one of the sub-layers includes the compliant, deformable material, wherein another of the sub-layers includes a compliant, deformable second material.

19. The apparatus as recited in claim 18, wherein the compliant, deformable material includes a photoresist, wherein the compliant, deformable second material includes aluminum.

20. The apparatus as recited in claim 16, comprising:
a second encapsulation layer which includes a compliant, deformable second material,
wherein at least some of the plurality of transducers are sandwiched between at least a portion of the second encapsulation layer and the closure.

* * * * *